United States Patent
Schwertfeger et al.

(10) Patent No.: US 7,470,725 B2
(45) Date of Patent: *Dec. 30, 2008

(54) ORGANICALLY MODIFIED AEROGELS, PROCESSES FOR THEIR PREPARATION BY SURFACE MODIFICATION OF THE AQUEOUS GEL, WITHOUT PRIOR SOLVENT EXCHANGE, AND SUBSEQUENT DRYING, AND THEIR USE

(75) Inventors: Fritz Schwertfeger, Mühldorf (DE); Dierk Frank, München (DE)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/817,459

(22) Filed: Mar. 26, 2001

(65) Prior Publication Data

US 2001/0034375 A1 Oct. 25, 2001

Related U.S. Application Data

(63) Continuation of application No. 09/308,888, filed as application No. PCT/EP97/06595 on Nov. 26, 1997, now abandoned.

(30) Foreign Application Priority Data

Nov. 26, 1996 (DE) ................ 196 48 798

(51) Int. Cl.
C01B 33/18 (2006.01)
C01B 33/193 (2006.01)
B05D 7/00 (2006.01)
B01J 13/00 (2006.01)

(52) U.S. Cl. ............ 516/100; 516/101; 427/220; 428/405; 423/338; 106/490

(58) Field of Classification Search ............ 516/100, 516/101; 427/220; 428/405; 423/338; 106/490; 252/62

See application file for complete search history.

(56) References Cited

U.S. PATENT DOCUMENTS

| | | | | |
|---|---|---|---|---|
| 2,093,454 A | 9/1937 | Kistler | ............ | 423/252 |
| 2,541,137 A | 2/1951 | Warrick | ............ | 524/588 |
| 2,680,696 A | 6/1954 | Broge | ............ | 427/220 |
| 2,786,042 A | 3/1957 | Iler | ............ | 525/310 |
| 2,886,460 A | 5/1959 | Alexander et al. | ............ | 106/490 |
| 2,978,298 A | 4/1961 | Wetzel | ............ | 423/338 |
| 3,015,645 A | 1/1962 | Tyler | ............ | 528/12 |
| 3,024,126 A | 3/1962 | Brown | ............ | 106/490 |
| 3,122,520 A | 2/1964 | Lentz | ............ | 106/490 |
| 3,615,142 A | 10/1971 | Dahlbom | ............ | 425/7 |
| 3,635,743 A | 1/1972 | Smith | ............ | 257/343 |
| 3,794,713 A | 2/1974 | Aboutboul | ............ | 423/338 |
| 3,872,217 A | 3/1975 | Merz | ............ | 423/338 |
| 3,920,865 A | 11/1975 | Laufer et al. | ............ | 427/220 |
| 4,101,442 A | 7/1978 | Rosen | ............ | 516/118 |
| 4,101,443 A | 7/1978 | Rosen | ............ | 516/120 |
| 4,190,457 A | 2/1980 | McDaniel | ............ | 502/405 |
| 4,208,316 A | 6/1980 | Nauroth et al. | ............ | 524/789 |
| 4,316,807 A | 2/1982 | McDaniel et al. | ............ | 507/127 |
| 4,344,800 A | 8/1982 | Lutz | ............ | 106/481 |
| 4,382,070 A | 5/1983 | Novak et al. | ............ | 423/338 |
| 4,667,417 A | 5/1987 | Graser et al. | ............ | 34/9 |
| 4,704,374 A | 11/1987 | Jacques | ............ | 502/8 |
| 4,755,294 A | 7/1988 | Pradet et al. | ............ | 210/198.2 |
| 4,873,218 A | 10/1989 | Pekala | ............ | 502/418 |
| 4,888,309 A | 12/1989 | Araya | ............ | 501/80 |
| 4,888,369 A | 12/1989 | Moore | ............ | 524/100 |
| 4,906,676 A | 3/1990 | Ida | ............ | 523/312 |
| 4,950,502 A | 8/1990 | Saam | ............ | 427/213.36 |
| 4,950,635 A | 8/1990 | Williams et al. | ............ | 502/401 |
| 5,001,183 A | 3/1991 | Sands | ............ | 524/493 |
| 5,009,874 A | 4/1991 | Parmentier | ............ | 423/335 |
| 5,069,815 A | 12/1991 | Aoki et al. | ............ | 252/301.36 |
| 5,081,163 A | 1/1992 | Pekala | ............ | 521/187 |
| 5,122,291 A | 6/1992 | Wolff et al. | ............ | 252/62 |
| 5,134,110 A * | 7/1992 | Sudo et al. | ............ | 502/407 X |
| 5,194,333 A | 3/1993 | Ohnaka et al. | ............ | 428/405 |
| 5,215,733 A | 6/1993 | Potter | ............ | 423/338 |
| 5,275,796 A | 1/1994 | Tillotson | ............ | 423/338 |
| 5,294,480 A | 3/1994 | Mielke et al. | ............ | 428/240 |
| 5,409,683 A | 4/1995 | Tillotson | ............ | 423/338 |
| 5,455,216 A | 10/1995 | Mueller et al. | ............ | 502/256 |
| 5,484,818 A | 1/1996 | De Vos | ............ | 521/123 |
| 5,496,527 A | 3/1996 | Yokogawa | ............ | 423/338 |
| 5,508,341 A | 4/1996 | Mayer et al. | ............ | 524/596 |
| 5,556,892 A | 9/1996 | Pekala | ............ | 521/181 |
| 5,561,318 A | 10/1996 | Gnade | ............ | 257/638 |
| 5,565,142 A | 10/1996 | Deshpande | ............ | 252/62 |
| 5,595,593 A | 1/1997 | Burns | ............ | 106/499 |
| 5,625,013 A | 4/1997 | Mueller et al. | ............ | 526/106 |

(Continued)

FOREIGN PATENT DOCUMENTS

DE       261 581      6/1913

(Continued)

Primary Examiner—Daniel S Metzmaier

(57) ABSTRACT

The present invention relates to novel, organically modified aerogels, uses thereof, and a process for producing them in which a) a hydrogel is introduced as an initial charge, b) the hydrogel obtained in step a) is subjected to surface modification, and c) the surface-modified gel obtained in step b) is dried. The present invention additionally relates to novel, organically modified wet gels, to a process for producing them, and to their use.

46 Claims, 2 Drawing Sheets

U.S. PATENT DOCUMENTS

| | | | |
|---|---|---|---|
| 5,647,962 A | 7/1997 | Jansen et al. | 203/57 |
| 5,651,921 A | 7/1997 | Kaijou | 516/34 |
| 5,656,195 A | 8/1997 | Mielke et al. | 252/62 |
| 5,674,962 A | 10/1997 | Ito et al. | 526/323.1 |
| 5,705,535 A | 1/1998 | Jansen | 521/64 |
| 5,708,069 A | 1/1998 | Burns | 524/403 |
| 5,738,801 A * | 4/1998 | Ziegler et al. | 252/62 |
| 5,750,610 A | 5/1998 | Burns | 524/434 |
| 5,759,506 A | 6/1998 | Jansen et al. | 423/338 |
| 5,786,059 A | 7/1998 | Frank et al. | 442/68 |
| 5,795,556 A | 8/1998 | Jansen et al. | 423/338 |
| 5,866,027 A | 2/1999 | Frank | 252/62 |
| 5,888,425 A | 3/1999 | Schwertfeger | 427/220 |
| 5,948,314 A | 9/1999 | Geiss et al. | 252/62 |
| 6,040,375 A | 3/2000 | Behme et al. | 524/492 |
| 6,080,475 A * | 6/2000 | Frank et al. | 428/331 |
| 6,083,619 A * | 7/2000 | Frank et al. | 428/331 |
| 6,107,351 A * | 8/2000 | Burns et al. | 516/100 |
| 6,129,949 A | 10/2000 | Schwertfeger et al. | 427/220 |
| 6,159,539 A * | 12/2000 | Schwertfeger et al. | 427/220 |
| 6,159,540 A * | 12/2000 | Menon et al. | 427/220 |
| 6,174,926 B1 * | 1/2001 | Menon et al. | 516/100 |
| 6,239,243 B1 | 5/2001 | Deng et al. | 528/12 |
| 6,378,229 B1 * | 4/2002 | Hartel et al. | 34/452 |
| 6,440,381 B1 * | 8/2002 | Smith et al. | 423/335 |
| 6,475,561 B1 * | 11/2002 | Schwertfeger | 427/220 |
| 6,481,649 B1 * | 11/2002 | Schmidt | 241/3 |
| 6,620,355 B1 * | 9/2003 | Schmidt | 264/41 |

FOREIGN PATENT DOCUMENTS

| | | | |
|---|---|---|---|
| DE | 296 898 | | 3/1917 |
| DE | 896 189 | | 11/1953 |
| DE | 1 667 078 | | 5/1971 |
| DE | 33 29 016 | | 2/1985 |
| EP | 0 031 166 | | 7/1981 |
| WO | WO 95/06617 | * | 3/1995 |
| WO | WO 96/12683 | * | 5/1996 |
| WO | WO 97/03017 | * | 1/1997 |
| WO | WO 97/10187 | A1 | 3/1997 |
| WO | WO 98/05591 | | 2/1998 |
| WO | WO 99/64504 | | 12/1999 |

* cited by examiner

200 μm

100 μm

ORGANICALLY MODIFIED AEROGELS, PROCESSES FOR THEIR PREPARATION BY SURFACE MODIFICATION OF THE AQUEOUS GEL, WITHOUT PRIOR SOLVENT EXCHANGE, AND SUBSEQUENT DRYING, AND THEIR USE

This application is a continuation of U.S. patent application Ser. No. 09/308,888 filed Dec. 9, 1999, now abandoned, which is U.S. National Phase Application under 35 U.S.C. § 371 of PCT/EP97/06595 filed on Nov. 26, 1997.

DESCRIPTION

Organically modified aerogels, processes for their preparation by surface modification of the aqueous gel, without prior solvent exchange, and subsequent drying, and their use The present invention relates to novel organically modified aerogels, to processes for their preparation and to their use.

Aerogels, especially those with porosities above 60% and densities below 0.6 g/cm$^3$, have an extremely low thermal conductivity and are therefore employed as thermal insulation materials, as described, for example, in EP-A-171 722.

Aerogels in the wider sense, i.e. in the sense of "gel with air as dispersion medium", are prepared by drying an appropriate gel. The term "aerogel" in this sense includes aerogels in the narrower sense, xerogels and cryogels. A dried gel is described as an aerogel in the narrower sense if the gel liquid is removed at temperatures above the critical temperature and starting from pressures above the critical pressure. If, in contrast, the gel liquid is removed subcritically, for example with formation of a liquid-vapor boundary phase, then the resultant gel is often also described as a xerogel.

When the term aerogels is used in the present application it relates to aerogels in the wider sense, i.e. in the sense of "gel with air as dispersion medium".

In addition, aerogels can be divided fundamentally into inorganic and organic aerogels in accordance with the type of gel structure.

Inorganic aerogels have been known since as early as 1931 (S. S. Kistler, Nature 1931, 127, 741). These first aerogels were prepared from waterglass and an acid as starting materials. In the resultant wet gels the water was exchanged for an organic solvent and this lyogel was then subjected to supercritical drying. In this way, hydrophilic aerogels were obtained, as disclosed, for example in U.S. Pat. No. 2,093,454.

A very wide variety of inorganic aerogels have been prepared to date. For example, SiO$_2$—, Al$_{2O3}$—, TiO$_2$—, ZrO$_2$—, SnO$_2$—, Li$_2$O—, CeO$_2$— and V$_2$O$_5$ aerogels and mixtures of these have been prepared (H. D. Gesser, P. C. Goswami, Chem. Rev. 1989, 89, 765 ff).

For a number of years, organic aerogels have also been known. Examples found in the literature are organic aerogels based on resorcinol/formaldehyde, melamine/formaldehyde or resorcinol/furfural (R. W. Pekala, J. Mater. Sci. 1989, 24, 3221, U.S. Pat. No. 5,508,341, RD 388047, WO 94/22943 and U.S. Pat. No. 5,556,892). Also known, furthermore, are organic aerogels formed from polyisocyanates (WO 95/03358) and polyurethanes (U.S. Pat. No. 5,484,818). The procedure here, as described, for example, in U.S. Pat. No. 5,508,341, starting from materials such as formaldehyde and resorcinol dissolved in water, is to react these materials with one another by means of suitable catalysts, to exchange the water in the pores of the resulting gel for an appropriate organic solvent, and then to subject the gel to supercritical drying.

Inorganic aerogels can be prepared in a variety of ways.

Firstly, SiO$_2$ aerogels, for example, can be prepared by acidic hydrolysis and condensation of tetraethyl orthosilicate in ethanol. This produces a gel which can be dried by supercritical drying while retaining its structure. Preparation processes based on this drying technique are known, for example, from EP-A-0 396 076, WO 92/03378 and WO 95/06617.

An alternative to the above drying is offered by a process for the subcritical drying of SiO$_2$ gels, in which said gels before being dried are reacted with a chlorine-containing silylating agent. The SiO$_2$ gel can be obtained, for example, by acidic hydrolysis of tetraalkoxysilanes, preferably tetraethoxysilane (TEOS), in an appropriate organic solvent, preferably ethanol, by reaction with water. Exchange of the solvent for an appropriate organic solvent is followed by a further step of reacting the resulting gel with a chlorine-containing silylating agent. Silylating agents employed in this case, owing to their reactivity, are preferably methylchlorosilanes (Me$_{4-n}$SiCl$_n$ where n=1 to 3). The resultant SiO$_2$ gel, modified on its surface with methylsilyl groups, can subsequently be dried in air from an organic solvent. In this way it is possible to obtain aerogels having densities below 0.4 g/cm$^3$ and porosities of more than 60%. The preparation process based on this drying technique is described exhaustively in WO 94/25149.

Before being dried it is possible, furthermore, for the above-described gels in the alcohol solution containing the amount of water required for the reaction to have tetraalkoxysilanes added to them and to be aged in order to increase the gel network strength, as disclosed, for example, in WO 92/20623.

The tetraalkoxysilanes used as starting materials in the processes described above, however, constitute an extremely high cost factor. Considerable cost reduction can be achieved by using waterglass as starting material for the preparation of SiO$_2$ aerogels.

This can be done, for example, by taking an aqueous waterglass solution and using an ion exchanger resin to prepare from it a silicic acid which through addition of a base undergoes polycondensation to a SiO$_2$ gel. Exchange of the aqueous medium for an appropriate organic solvent is followed by a further step of reacting the resulting gel with a chlorine-containing silylating agent. Silylating agents employed in this case, owing to their reactivity, are also preferably methylchlorosilane (Me$_{4-n}$SiCl$_n$ where n=1 to 3). The resultant SiO$_2$ gel, modified on its surface with methylsilyl groups, can likewise subsequently be dried in air from an organic solvent. The preparation process based on this technique is described exhaustively in EP-A-0 658 513.

In U.S. Pat. No. 3,015,645 the hydrogel is obtained by adding a mineral acid to a waterglass solution. After the hydrogel has been formed the water in the gel is exchanged for an organic solvent and then the gel is silylated by means of a silylating agent, preferably a chloroalkylsilane, and is subjected to subcritical drying.

DE-C-195 02 453 describes the use of a chlorine-free silylating agent. For this purpose, for example, a silicatic lyogel prepared by the processes described above is introduced into a reaction vessel where it is reacted with a chlorine-free silylating agent. Silylating agents employed in that case are preferably methylisopropenoxysilanes (Me$_{4-n}$Si(OC(CH$_3$)CH$_2$)$_n$ where n=1 to 3). The resultant SiO$_2$ gel, modified on the surface with methylsilyl groups, can then likewise be dried in air from an organic solvent. The use of the chlorine-free silylating agents, however, constitutes a very high cost factor.

WO 95/06617 and DE-A-195 41 279 disclose processes for preparing silica aerogels having hydrophobic surface groups.

In WO 95/06617 the silica aerogels are obtained by reacting a waterglass solution with an acid at a pH of from 7.5 to 11, substantially freeing the resulting silica hydrogel from ionic constituents, by washing with water or dilute aqueous solutions of inorganic bases, the pH of the hydrogel being kept in the range from 7.5 to 11, displacing the aqueous phase in the hydrogel by an alcohol, and then subjecting the resulting alcogel to supercritical drying.

In DE-A-195 41 279 silica aerogels are prepared in a manner similar to that described in WO 95/06617 and are then subjected to subcritical drying.

With both processes, however, the avoidance of chlorine-containing silylating agents leads only to an aerogel having hydrophobic surface groups attached via oxygen. In a water-containing atmosphere, said groups are very easily split off again. As a result, the aerogel described is hydrophobic for only a short time.

A common feature of all of the prior art processes for preparing aerogels having a density of less than 300 kg/m$^3$ is that, before drying, the water is exchanged for an organic solvent or $CO_2$. In the case of supercritical drying the water from the pores of the hydrogel is exchanged beforehand for an organic solvent so that the water in the supercritical state does not attack or disintegrate the network. In the case of preparation by subcritical drying, the necessary surface modification is likewise preceded by exchange of the water in the hydrogel for an organic solvent. In the view of those skilled in the art this was and is necessary because in the case of silylating agents, for example, either the silylating agents do not dissolve in water and so cannot be introduced into the gel by way of the water phase in which the gel particles are usually located, or the silylating agents react in water with the water or with each other and so are no longer available for the silylation of the gel or are greatly reduced in their reactivity.

Furthermore, it is possible to employ organically modified gels, without final drying to the aerogel, in a wide variety of fields, such as in chromatography, in cosmetics and in the pharmaceutical sector, for example.

As for the preparation of aerogels, it was likewise the view of those skilled in the art that, in the case of organically modified wet gels, exchange of the water in the pores of the gels for a different solvent was necessary.

Exchange of the water for a different solvent, however, in any case consumes both time and energy and is cost intensive. Moreover, it is associated with considerable safety problems.

The object of the present invention, therefore, was to provide a process for preparing organically modified aerogels which can be carried out using a common means for the surface modification and avoiding solvent exchange of the water for a different solvent.

This object is surprisingly achieved by a process for preparing organically modified aerogels which comprises
a) introducing a hydrogel as initial charge,
b) modifying the surface of the hydrogel obtained in step a), and
c) drying the surface-modified gel obtained in step b).

The hydrogel obtained is preferably surface silylated in step b).

FIG. 1 and FIG. 2 are images of the aerogels of the present invention. FIG. 1 is an image from a light microscope and FIG. 2 is a scanning electron microscope image.

In a first preferred embodiment, silylating agents employed are disiloxanes of the formula I and/or disilazanes of formula II

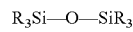

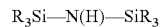

where the radicals R independently of one another are identical or different and are each a hydrogen atom or a nonreactive, organic, linear, branched, cyclic, saturated or unsaturated, aromatic or heteroaromatic radical.

In a second preferred embodiment silylating agents employed are silanes of the formula $R^1_{4-n} SiCl_n$ or $R^1_{4-n}Si(OR^2)_n$, where n=1 to 4 and where $R^1$ and $R^2$ independently of one another are identical or different and are each a hydrogen atom or a nonreactive, organic, linear, branched, cyclic, saturated or unsaturated, aromatic or heteroaromatic radical.

By a hydrogel in the present application is meant a gel which is in dispersion in at least one solvent, the liquid phase containing at least 50% by weight, preferably at least 80% by weight, with particular preference at least 90% by weight and, in particular, at least 98% by weight water. A hydrogel is thus a special case of a lyogel, i.e. a gel which contains a liquid.

In step b) the silylating agent is supplied directly as a reactant without prior exchange of the water present in the pores for an organic solvent or $CO_2$.

The hydrogel network can be present in any desired base composition, whether organic and/or inorganic. All systems known to the skilled worker from the prior art are suitable as the organic base composition. An inorganic base composition is preferably based on oxidic silicon, tin, aluminum, gallium, indium, titanium and/or zirconium compounds, and with particular preference is based on oxidic silicon, aluminum, titanium and/or zirconium compounds. Very special preference is given to a silicatic hydrogel possibly comprising fractions of zirconium, aluminum, titanium, vanadium and/or iron compounds, especially a purely silicatic hydrogel. In the case of the organic and/or inorganic base compositions the various components need not necessarily be distributed homogeneously nor form a coherent network. It is also possible for all or some of individual components to be present in the network in the form of inclusions, individual nuclei and/or accumulations.

Figure 1:
FIG. 1 shows aerogel particles.

In the text below, three preferred embodiments for preparing hydrogels are described but without thereby restricting the invention.

In a first preferred embodiment in step a) a silicatic hydrogel is introduced, as initial charge, which is prepared by bringing an aqueous waterglass solution to a pH ≦3 with the aid of an acidic ion exchanger resin, a mineral acid or a hydrochloric acid solution, polycondensing the resulting silicic acid by addition of a base, to form a $SiO_2$ gel, and washing the gel with water to free it from any electrolyte. Said polycondensation to the $SiO_2$ gel can take place either in one step or else in a multistage procedure.

The waterglass used is preferably sodium and/or potassium waterglass. As the ion exchanger resin it is preferred to use an acidic resin, those containing sulfonic acid groups being particularly suitable. If mineral acids are employed, hydrochloric acid and sulfuric acid are particularly suitable. If hydrochloric acid solutions are employed, particularly suitable such solutions are those of aluminum salts, especially aluminum sulfate and/or chloride. The base employed is generally $NH_4OH$, $NaOH$, $KOH$, $Al(OH)_3$ and/or colloidal silica.

The hydrogel preferably prepared from the above-described silicatic starting compounds may additionally comprise compounds of titanium, tin, aluminum and/or zirconium which are capable of condensation.

In addition it is possible, before and/or during the preparation of a gel, to add opacifying additives, especially IR opacifiers, to reduce the radiant contribution to the thermal conductivity, examples being carbon black, titanium oxides, iron oxides and/or zirconium oxides.

It is possible, furthermore, to add fibers to the sol in order to increase the mechanical stability. Fiber materials which can be used include inorganic fibers, such as glass fibers or mineral fibers, organic fibers, such as polyester, aramid or nylon fibers or fibers of plant origin, and mixtures thereof. The fibers can also be in coated form, examples being polyester fibers metallized with a metal such as aluminum, for example.

The hydrogel is generally prepared at a temperature between the freezing point and the boiling point of the solution. This preparation may if desired include a simultaneous shaping step, such as spray forming, extrusion or the formation of droplets, for example.

In addition, the resultant hydrogel can be subjected to aging. This aging can be carried out before and/or after the above-described option of washing with water by which the gel is washed to free it essentially from electrolyte.

Aging generally takes place at a temperature in the range from 20 to 100° C., preferably at from 40 to 100° C. and, in particular, at from 80 to 100° C., and at a pH of from 4 to 11, preferably from 5 to 9 and, in particular, from 5 to 8. The aging time is generally up to 48 hours, preferably up to 24 hours and, with particular preference, up to 3 hours.

In a second preferred embodiment in step a) a silicatic hydrogel initial charge is introduced which is prepared by obtaining an $SiO_2$ gel from an aqueous waterglass solution with the aid of at least one organic and/or inorganic acid and via the intermediate stage of a silica sol.

The waterglass solution used in this case is generally a from 6 to 25% strength by weight solution (based on the $SiO_2$ content) of sodium and/or potassium waterglass. Preference is given to a waterglass solution with a strength of from 10 to 25% by weight, in particular from 10 to 18% by weight.

In addition, the waterglass solution may also include—based on $SiO_2$—up to 90% by weight of compounds of titanium, tin, aluminum and/or zirconium which are capable of condensation.

Acids used are generally from 1 to 50% strength by weight acids, preferably from 1 to 10% strength by weight acids. Preferred acids are sulfuric, phosphoric, hydrofluoric, oxalic and hydrochloric acid. Particular preference is given to hydrochloric acid. Alternatively, however, mixtures of the corresponding acids can be employed.

In addition to the actual mixing of the waterglass solution and the acid it is also possible, furthermore, first to add some of the acid to the waterglass solution until a pH $\geqq 8$ is obtained and, in a further step, to establish the abovementioned pH of the sol, and/or first to add some of the waterglass solution to the acid until the pH is $\leqq 4$ and, in a further step, to establish the final pH. In this way it is possible to vary the proportion of the waterglass solution/acid material flows over a very wide range.

Mixing of the two solutions preferably gives a from 5 to 12% by weight $SiO_2$ gel. Particular preference is given to a from 6 to 9% by weight $SiO_2$ gel.

To ensure very thorough mixing of the waterglass solution and the acid before a $SiO_2$ gel develops the two solutions should preferably have, independently of one another a temperature of between 0 and 30° C., with particular preference between 5 and 25° C. and, in particular, between 10 and 20° C.

Rapid mixing of the two solutions takes place in apparatus known to the skilled worker, such as stirred vessels, mixing nozzles and static mixers. Preference is given to semicontinuous or continuous processes, such as in mixing nozzles, for example.

The preparation may if desired comprise a simultaneous shaping step, for example by spray forming, extrusion or droplet formation.

The resulting hydrogel may in addition be subjected to aging. This takes place in general at from 20 to 100° C., preferably from 40 to 100° C. and, in particular, from 80 to 100° C. and a pH of from 2.5 to 11, preferably from 5 to 8. The aging time is generally up to 12 hours, preferably up to 2 hours and, with particular preference, up to 30 minutes.

The gel prepared is preferably washed with water, with particular preference until the wash water used is free from electrolyte. If the gel is aged, washing can be carried out before, during and/or after aging, in this case preferably during or after aging. For the purpose of washing, some of the water can be replaced by organic solvents. The water content, however, should preferably be high enough for the salts not to crystallize out in the pores of the hydrogel.

In order to achieve very substantial removal of sodium ions and/or potassium ions the hydrogel can be washed, before, during and/or after washing with water, with a mineral acid as well. Preferred mineral acids in this case are again the mineral acids mentioned as being preferred for preparing the hydrogel.

Furthermore, opacifying additives can be added to the waterglass, the acid and/or the sol; these opacifiers are, in particular, IR opacifiers for reducing the radiant contribution to the thermal conductivity, examples being carbon black, titanium oxides, iron oxides and/or zirconium oxides.

It is possible, moreover, to add fibers to the waterglass, the acid and/or the sol in order to increase the mechanical stability. Fiber materials which can be used include inorganic fibers, such as glass fibers or mineral fibers, organic fibers, such as polyester, aramid or nylon fibers or fibers of plant origin, and mixtures of these. The fibers may also be in coated form, examples being polyester fibers metallized with a metal such as aluminum, for example.

In a third preferred embodiment in step a) a silicatic hydrogel initial charge is introduced which is obtained by hydrolysis and polycondensation of silicon tetrachloride ($SiCl_4$) with water. In this case hydrolysis and polycondensation can be carried out either in one step or in a multistage procedure. Preference is given to hydrolysis and polycondensation in one step.

The silicon tetrachloride here can be employed either in concentrated or in dilute form. Suitable dilution fluids or solvents are in principle all those which are miscible with silicon tetrachloride. Preference is given to aliphatic or aromatic hydrocarbons, aliphatic alcohols, ethers, esters or ketones, and water. Particularly preferred solvents are methanol, ethanol, isopropanol, acetone, tetrahydrofuran, pentane, n-hexane, n-heptane, toluene and water. Very particular preference is given to acetone, pentane, n-hexane, n-heptane and water. Alternatively, however, mixtures of these solvents can be used.

Miscible solvents can also be added, furthermore, to the water required for hydrolysis/polycondensation. Suitable solvents are again those described above.

The dilution of the silicon tetrachloride and/or the addition of solvent to the water required for hydrolysis/polycondensation should generally be carried out such that the hydrogel formed after the reaction has a $SiO_2$ concentration in the range from 4 to 12% by weight, preferably from 4 to 10% by weight and, with particular preference, from 4 to 9% by weight.

Acids or bases can also be added to the water. Preferred acids for this purpose are sulfuric, phosphoric, hydrofluoric, oxalic, acetic, formic and/or hydrochloric acid. Particular preference is given to hydrochloric acid and acetic acid. Hydrochloric acid is very particularly preferred. Alternatively, however, mixtures of the corresponding acids can be employed. Bases employed are generally $NH_4OH$, NaOH, KOH and/or $Al(OH)_3$. Sodium hydroxide solution is preferred.

Furthermore, some or all of the abovementioned acids or bases can be added to the reaction mixture in the course of the hydrolysis/polycondensation reaction.

The hydrogel which is preferably prepared from the above-described silicon tetrachloride may additionally comprise compounds of titanium, tin, aluminum and/or zirconium which are capable of condensation. These compounds can be added to the above-described starting compounds, prior to or during the hydrolysis/polycondensation reaction, and/or can be added to the gel after it has formed.

It is possible, moreover, before and/or during the preparation of the gel, to add opacifier additives, especially IR opacifiers, to reduce the radiant contribution to the thermal conductivity, examples being carbon black, titanium oxides, iron oxides and/or zirconium oxides.

In order to enhance the mechanical stability of the gel it is possible, moreover, to add fibers to the starting materials. The fiber materials which can be used include inorganic fibers, such as glass fibers or mineral fibers, organic fibers, such as polyester, aramid or nylon fibers or fibers of plant origin, and mixtures thereof. The fibers may also be in coated form, examples being polyester fibers metallized with a metal such as aluminum, for example.

The hydrogel is generally prepared at a temperature between the freezing point and the boiling point of the reactants. Preference is given to a temperature of between 0° C. and 50° C., in particular a temperature between 0° C. and 30° C. In this case it is possible if desired for the preparation to be accompanied by a simultaneous shaping step such as spray forming, extrusion or droplet formation, for example.

The resulting hydrogel can also be subjected to aging. Aging takes place in general at a temperature in the range from 20 to 100° C., preferably from 40 to 100° C. The aging time is generally up to 48 hours, preferably up to 24 hours and in particular up to 3 hours. This aging can take place before and/or after possible washing of the hydrogel. In this case the hydrogel can be washed with the above-described solvents in order thereby, for example, to alter the pH in the pores of the hydrogel. Washing with water is preferred.

If there is less than 50% by weight of water in the pores of the hydrogel prior to step b), then washing is used to raise the water content of the pores to at least 50% by weight of water.

In step b) the hydrogel introduced in step a) is surface-modified, preferably surface-silylated. The invention is described in more detail below with reference to surface silylation but without being restricted thereto.

The silylating agent can in principle be in any aggregate state but is preferably in liquid form and/or is a gas or vapor.

If the silylating agent is used as a gas and/or vapor the temperature of the aqueous hydrogel is preferably between 20 and 100° C., with particular preference between 40 and 100° C. and, in particular, between 60 and 100° C. Under pressure, higher temperatures are also possible in order to avoid boiling of the water in the gel capillaries.

If the silylating agent is used as a liquid the temperature of the aqueous hydrogel is preferably between 20 and 100° C. Under pressure, higher temperatures are also possible in order to avoid boiling of the water in the gel capillaries.

If the silylating agent is used as a gas and/or vapor it may be present during the reaction in a gas stream or in a static gas atmosphere.

The temperature of the silylating agent or agents in the gas phase can also be increased by means of pressure or by an additional gas stream.

In a preferred embodiment, the silylating agent can also be introduced in liquid phase. In this case it can be employed directly as liquid phase and/or may form on the surface of the hydrogel as a result of the condensation of a gas employed. The temperature of the liquid phase can then be between 0° C. and the boiling point of the silylating agent/agents. Preference is given to temperatures between 20 and 100° C. If desired, it is also possible to operate under pressure with higher temperatures. In general, surface silylation takes place faster at higher temperatures.

In accordance with a preferred embodiment, disiloxanes of the formula I and/or disilazanes of the formula II are employed as silylating agents.

$$R_3Si\text{—}O\text{—}SiR_3 \quad (I)$$

$$R_3Si\text{—}N(H)\text{—}SiR_3 \quad (II)$$

where the radicals R independently of one another are identical or different and are each a hydrogen atom or a nonreactive, organic, linear, branched, cyclic, saturated or unsaturated, aromatic or heteroaromatic radical, preferably $C_1$-$C_{18}$-alkyl or $C_6$-$C_{14}$-aryl, particularly preferably $C_1$-$C_6$-alkyl, cyclohexyl or phenyl, especially methyl or ethyl.

Preferably the hydrogel in step b) is reacted with a symmetrical disiloxane—that is, one in which both Si atoms have the same radicals R.

It is particularly preferred to employ disiloxanes in which all radicals R are identical. In particular, hexamethyidisiloxane is used.

It is possible, furthermore, to employ all silylating agents known to the skilled worker which are immiscible with water.

If the silylating agents are largely or wholly insoluble in water, as is the case for hexamethyidisiloxane (HMDSO), for example, then they are easy to separate from the aqueous phase which forms as a result of the water in and from the gel. This permits easy recycling of excess reagents. By this means it is possible, for example, to minimize the silylation times by using excess concentrations.

The silylating agents necessary for the actual silylation reaction can also be generated from other substances, preferably other silylating agents. This can be done shortly before and/or during the silylation. Furthermore, it can also be done not until directly before and/or during the reaction on the internal surface of the hydrogel. In this context the term silylating agents also includes a mixture of substances which are necessary for the actual silylation or which are in principle in chemical equilibrium with one another. The mixture may, for example, include a base or acid which acts as catalyst.

Preferred acids for this purpose are sulfuric, phosphoric, hydrofluoric, oxalic, acetic, formic and/or hydrochloric acid. Particular preference is given to hydrochloric acid and acetic acid. Hydrochloric acid is very particularly preferred. Alternatively, it is possible to use mixtures of the corresponding acids. Bases preferably employed are $NH_4OH$, NaOH, KOH and/or Al(OH)$_3$, with particular preference being given to sodium hydroxide solution. The acids or bases can be added before, during and/or after the addition of the silylating agent or agents.

Surface silylation in step b) takes place in the presence of at least one silylating agent and, if desired, at least one acid or one base already present in the hydrogel, preference being given here again to the abovementioned acids and bases.

The acid or base can be introduced into the aqueous gel by means of any technique known to the skilled worker. Preference is given here to washing with aqueous solutions of the acids or bases or treatment by means of gaseous acids or bases. With particular preference the acids or bases are in the form of highly concentrated aqueous solutions or of gases, especially gases.

The concentrations present in the water of the wet gels are, in general, in the range between 5% by weight and the maximum possible concentration, preferably in the range between 10% by weight and the maximum possible concentration. In the case of hydrochloric acid the concentrations are greater than 5% by weight, preferably greater than 10% by weight and, with particular preference, greater than 15% by weight.

Furthermore, the silylating agents, too, together with acids or bases, can be vaporized and/or combined- in the gas phase and/or mixed in the liquid phase. Reaction of the silylating agents with the acids or bases prior to and/or during vaporization and/or in the gas phase and/or in the liquid phase is likewise possible.

In general, surface modification is accelerated at relatively high concentrations of acids or bases.

In a further, particularly preferred embodiment, the hydrogel is introduced in the silylating agent or agents, and then at least one acid and/or base is added. This can be done by means of any technique known to the skilled worker. Preference is given to treatment by means of gaseous acids or bases.

Preferred acids for this purpose are sulfuric, phosphoric, hydrofluoric, oxalic, acetic, formic and/or hydrochloric acid. Particular preference is given to hydrochloric acid. It is also, however, possible to use mixtures of the corresponding acids. Bases employed are preferably ammonia, NH$_4$OH, NaOH, KOH and/or Al(OH)$_3$, with particular preference being given to ammonia.

Silylating agents which can be employed are, in principle, all of the abovementioned silylating agents. Preferred silylating agents are disiloxanes where all radicals R are identical. In particular, hexamethyldisiloxane is used.

Furthermore, all silylating agents known to the skilled worker can be employed.

The addition of the acids and/or bases to the hydrogel is accompanied by the actual surface modification or silylation reaction. The concentrations of acids or bases which are achieved in this case in the water of the wet gels are, in general, in the range between 5% by weight and the maximum possible concentration, preferably in the range between 10% by weight and the maximum possible concentration. In the case of hydrochloric acid the concentrations are greater than 5% by weight, preferably greater than 10% by weight and, with particular preference, greater than 15% by weight.

In the case of gaseous acids or bases, the dissolving process may be accompanied by the development of heat of dissolution in the water of the hydrogel. Preferably, this leads to a more or less strong heating of the system. This preferably has an accelerating action on the surface modification reaction or silylation reaction.

In general, and especially in the case of the preferred embodiment described, surface modification takes place faster at higher concentrations of acids or bases.

In the process it is possible that the reaction of the silylating agent or agents with the acid or base in and/or outside the hydrogel will lead to the formation of a compound which is able in turn to react—possibly even in an accelerating or autocatalyzed manner—with the internal surface of the gel.

This will be explained briefly using hexamethyidisiloxane as example but without restricting the invention.

Hexamethyldisiloxane, which is insoluble in water, can react both with the internal surface of the wet gels and, for example, with HCl in the water of the hydrogel pores. The reaction with HCl produces trimethylchlorosilane and water. The trimethylchlorosilane produced is then in turn soluble both in the water of the pores and in the hexamethyldisiloxane. It is able on the one hand to diffuse into the water phase and to react with the internal surface of the hydrogel and/or with the water in the pores, and on the other hand to diffuse into the hexamethyidisiloxane and likewise react with the internal surface of the hydrogel. This raises the concentration of reactive molecules in the water phase and in the hexamethyidisiloxane, and the internal surface situated further within the pores can be reached more quickly by the silylating agent.

In accordance with a further preferred embodiment the silylating agents employed are silanes of the formulae $R^1_{4-n}SiCl_n$ or $R^1_{4-n}Si(OR^2)_n$ where n=1 to 4, preferably 1 to 3, and where $R^1$ and $R^2$ independently of one another are identical or different and are each a hydrogen atom or a nonreactive, organic, linear, branched, cyclic, saturated or unsaturated, aromatic or heteroaromatic radical, preferably $C_1$-$C_{18}$-alkyl or $C_6$-$C_{14}$-aryl, and with particular preference $C_1$-$C_6$-alkyl, cyclohexyl or phenyl, especially methyl or ethyl. Trimethylchlorosilane is preferably used. Isopropenoxysilanes and silazanes are also suitable.

The silylating agents necessary for the actual silylation reaction can also be generated from other substances, preferably other silylating agents. This can be done shortly before and/or during the silylation. Furthermore, it can also be done directly before and/or during the reaction on the internal surface of the hydrogel. The term silylating agents also includes a mixture of substances which are necessary for the actual silylation or which are in principle in chemical equilibrium with one another. The mixture may, for example, include a base or acid which acts as catalyst.

Preferred acids for this purpose are sulfuric, phosphoric, hydrofluoric or oxalic, acetic, formic and/or hydrochloric acid. Particular preference is given to hydrochloric and acetic acid. Hydrochloric acid is very particularly preferred. Alternatively, it is possible to use mixtures of the corresponding acids. Bases preferably employed are NH$_4$OH, NaOH, KOH and/or Al(OH)$_3$, with particular preference being given to sodium hydroxide solution. The acids or bases can be added before, during and/or after the addition of the silylating agent or agents. Furthermore, the silylating agents, together with the acids or bases, can also be vaporized and/or combined in the gas phase and/or mixed in the liquid phase. Reaction of the silylating agents with the acids or bases prior to and/or during vaporization and/or in the gas phase and/or in the liquid phase is likewise possible. However, it is also possible to dissolve the acids or bases in the water of the hydrogel.

Furthermore, the silylation car, if desired, be accelerated or catalyzed by means of specific substances or catalysts respectively, for example by means of at least one acid or base, which are present in the aqueous gel. Acids or bases in this case are preferably, again, those mentioned above as being preferred. Said acid or base can be introduced in the aqueous gel by means of any technique known to the skilled worker. Preference is given here to washing with aqueous solutions of the acids or bases, or treatment by means of gaseous acids or bases. With particular preference the acids or bases are in the form of highly concentrated aqueous solutions or gases, in particular as gases.

The concentrations of the acids or bases which are present in the water of the wet gels are, in general, in the range between 0% by weight and the maximum possible concentration. In the case of hydrochloric acid the concentrations are greater than 1% by weight, preferably greater than 5% by weight, with particular preference greater than 10% by weight and, with special preference, greater than 15% by weight.

It is additionally possible for the reaction of the silylating agent or agents with the internal surface of the gel and/or of the water in the gel to lead to the formation of a compound, such as an acid or base, for example, which accelerates or autocatalyzes the further reaction of the silylating agent or agents.

This will be explained briefly using trimethylchlorosilane as example but without restricting the invention.

Trimethylchlorosilane is able to react both with the internal surface of the wet gels and with the water in the pores of the wet gels. In the case of reaction with the internal surface, HCl is formed as byproduct. In the case of the reaction with water, hexamethyidisiloxane and HCl are formed. The HCl formed, which is present in dissociated form in the remaining water, is then able to accelerate the subsequent reaction with the internal surface and, in addition, to cleave resultant hexamethyidisiloxane back to trimethylchlorosilane. As a result there is an increase in the concentration of reactive molecules.

If the reaction of the silylating agents used with the internal surface of the gels involves the elimination of anions which lead to the formation of acids and bases then the result of this is an increase in the concentration of acid or base, respectively, in the wet gel.

A further possibility is to dry the external surface of the wet gel particles before actual silylation. This can be carried out by all drying methods known to the skilled worker, preferably at temperatures from −30 to 200° C., with particular preference from 0 to 200° C., and at pressures preferably from 0.001 to 20 bar, with particular preference from 0.01 to 5 bar and, in particular, from 0.1 to 2 bar, by means, for example, of radiation, convection and/or contact drying. Preference is given to the drying of the external surface by means of at least one gas. In this case, all chemically inert gases are preferred. Particular preference is given to nitrogen and argon, especially nitrogen.

Said drying can also take place with at least one gas which through adsorption or reaction with the water in the pores leads to a change in pH in the pores of the wet gel, such as hydrochloric acid or ammonia for example. Preference is given here to the gases which lead to pH values of less than 7. HCl is particularly preferred. However, it is also possible to use mixtures with chemically inert gases.

If the wet gel heats up in this process, then there may be boiling within the pores. This can be avoided, if appropriate, by means of suitable methods, such as cooling or higher pressure, for example.

When using, for example, HCl gas the wet gel shrinks by an extent in the range from 0 to 40% by volume, preferably from 0 to 30% by volume and, with particular preference, from 5 to 20% by volume. This reduces, relative to the initial amount, the amount of water and/or organic substances which are located in the pores before and/or during and/or after the silylation and/or before subsequent drying, implying a reduction in the amount of substances to be used before and/or during and/or after the silylation and leading, in the course of subsequent drying, to a reduction in the amount of solvent to be evaporated from the pores, which significantly reduces the requirements in terms, for example, of size of apparatus and energy.

Drying of the external surface of the wet gel particles can, furthermore, also be carried out by displacing the water by means of an essentially water-insoluble silylating agent, such as hexamethyldisiloxane (HMDSO), for example.

In addition to the silylating agent it is also possible to use at least one carrier gas or carrier gas stream. Preference is given here to chemically inert gases. Nitrogen and argon are particularly preferred, especially nitrogen. The temperature of the carrier gas in this case is generally between 20 and 400° C.

Silylation is continued until the desired degree of coverage of the internal surface of the hydrogel has been reached. As a maximum, however, it is only possible to modify all chemically attainable surface groups.

In addition, by the choice of the parameters of temperature within and around the gel, temperature, concentration and type of silylating agent or agents and the flow rate, and the temperature and flow rate of the carrier gas or gases, if used, it is possible to adjust the degree of exchange of the water in the pores for the silylating agent or agents, and the degree of drying in the course of silylation.

By means of longer silylation it is possible to carry out complete or partial exchange of the water in the pores of the gel for the silylating agent or agents.

If, for example, the silylation is carried out such that some of the water in the pores of the hydrogel reacts with the silylating agent used (for example, trimethylchlorosilane) to form a water-insoluble compound (hexamethyldisiloxane, for example) then the molar volume of the compound formed automatically displaces at least some of the water from the pores.

During the silylation of the internal surface of the network this leads to partial or complete exchange of the liquid in the pores of the hydrogel by a water-insoluble medium. These water-insoluble media are easy to separate from the aqueous phase which is formed by the water in and from the gel. This permits easy recycling of excess reagents. By this means it is possible, for example, to minimize the silylation times through the use of excess concentrations.

The substances formed by reaction of the water in the hydrogel with the silylating agent or agents can, if desired, be simply recycled to give one or more silylating agents. This will be explained briefly using the silylating agent TMCS as example.

TMCS reacts with the water in the hydrogel to form HMDSO and HCl. Following separation, HMDSO and HCl can be reacted again under suitable conditions to form TMCS and water.

The advantage is a reduction in the quantity of residuals in the present process.

Prior to step c) it is possible to wash the silylated gel, if desired, with a protic or aprotic solvent until unreacted silylating agent has essentially been removed (residual content $\geq 0.1\%$ by weight) and the water content of the gel is preferably <5% by weight, with particular preference <3% by weight and, in particular, <1% by weight. Solvents used are, in general, aliphatic alcohols, ethers, esters or ketones and also aliphatic or aromatic hydrocarbons. Preferred solvents are methanol, ethanol, acetone, tetrahydrofuran, ethyl acetate, dioxane, pentane, n-hexane, n-heptane and toluene. Also possible, however, is the use of mixtures of these solvents.

The gel can be washed with the silylating agents used, furthermore. Preference is given here to trimethylchlorosilane, trimethylsiloxane, hexamethyidisilazane and hexamethyidisiloxane. Hexamethyidisiloxane is particularly preferred. It is also possible, however, to use mixtures of these silylating agents.

For the subsequent, preferably subcritical drying it is favorable in principle if some or all of the pores of the gel contain solvents or solvent mixtures of low surface tension. Hexamethyidisiloxane is preferred.

In step c) the silylated and possibly washed gel is subjected to preferably subcritical drying, preferably at temperatures from −30 to 200° C., with particular preference from 0 to 150° C., and at pressures of preferably from 0.001 to 20 bar, with particular preference from 0.01 to 5 bar, especially from 0.1 to 2 bar, by means, for example, of radiation, convection and/or contact drying. Drying is preferably continued until the gel has a residual solvent content of less than 0.1% by weight. The aerogels obtained on drying are wholly or partially hydrophobic depending on the degree of modification. The hydrophobicity is permanent.

Alternatively, the gel obtained in step b) can be subjected to supercritical drying. In accordance with the particular solvent, this necessitates temperatures higher than 200° C. and/or pressures higher than 20 bar. Such conditions, although easily possible, are associated with increased expenditure.

In a further embodiment and depending on use, the gel can be subjected in addition to network reinforcement prior to silylation in step b). This reinforcement can be effected, for example, by reacting the resulting gel with a solution of a condensable orthosilicate of the formula $R^1_{4-n}Si(OR^2)_n$, preferably an alkyl and/or aryl orthosilicate, where n=2 to 4 and $R^1$ and $R^2$ independently of one another are hydrogen atoms or linear or branched $C_1$-$C_6$-alkyl, cyclohexyl or phenyl radicals, or with an aqueous silicic acid solution.

In a further embodiment the gel, after the shape-imparting polycondensation and/or after any subsequent process step, can be reduced in size by the techniques known to the skilled worker, such as grinding, for example.

It has surprisingly been found that in a further preferred embodiment of step b) the surface modification or silylation can be carried out in the presence of at least one ionic and/or nonionic compound in the wet gel. Preferred dissolved ionic compounds are, for example, sodium chloride, potassium chloride, calcium chloride, sodium sulfate or aluminum nitrate. Particular preference is given to salts which are formed in the reaction of waterglass with at least one mineral acid, such as sodium chloride. The concentrations are in general between 0% by weight and a saturated solution, preferably between 0% by weight and a semisaturated solution and, with particular preference, between 0% by weight and 10% by weight.

Examples of preferred nonionic compounds are carbon black, titanium oxides, iron oxides and/or zirconium oxides.

This process variant is described below with reference to dissolved sodium chloride in the pores of the hydrogel but without being restricted to this.

The concentrations of the sodium chloride dissolved in the water in the gel pores are in general between 0% by weight and a saturated solution, preferably between 0% by weight and a 20% strength by weight solution and, with particular preference, between 0% by weight and a 10% strength by weight solution, especially between 0% by weight and an 8% strength by weight solution.

Surface silylation in step b) takes place as described earlier. Depending on the precise experimental regime there may be partial crystallization of sodium chloride outside and/or inside the wet gel.

The salt which crystallizes outside the wet gel can be separated from the gel by methods known to the skilled worker, such as filtration. In this case the silylated gel can be washed, if desired, with a protic or aprotic solvent until the sodium chloride which has crystallized outside the wet gel has been essentially removed. Solvents used are, in general, aliphatic alcohols, ethers, esters or ketones and aliphatic or aromatic hydrocarbons or water. Preferred solvents are methanol, ethanol, acetone, tetrahydrofuran, ethyl acetate and water. Water is particularly preferred. The water may also contain salts, preferably those salts also to be washed from the aerogel. Alternatively, however, mixtures of these solvents can be used.

Furthermore, the gel can be washed with the silylating agents that are used. Preference is given here to trimethylchlorosilane, trimethylsiloxane, hexamethyidisilazane and hexamethyidisiloxane. Hexamethyidisiloxane is particularly preferred. It is also possible, however, to use mixtures of these silylating agents.

Another suitable means of removing crystallized sodium chloride from the outer surface of the gel particles during and/or after silylation is ultrasound.

If there is partial crystallization of sodium chloride within the gel then surprisingly, before, during and/or after drying, this does not lead to destruction of the gel particles on the macroscopic level.

In addition, the sodium chloride crystals present are preferably localized in an inner shell and/or in the core region of the aerogel particles. It is also notable that there are no NaCl crystals in the outer region of the aerogel particles (FIG. 1).

The light-colored regions in FIG. 1 are spherical aerogel monoliths in which the NaCl crystals appear in dark form (light microscope picture; scale: 1 cm corresponds to 200 μm).

Figure 2:
FIG. 2 shows a view of NaCl crystals in an aerogel monolith using a scanning electron microscope.

If the NaCl crystals in aerogel monoliths are viewed using a scanning electron microscope (SEM) then their dendritic form and structure (FIG. 2) are clearly evident in an order of magnitude of from about 20 to 200 μm (scale: 1 cm corresponds to 50 μm). Analysis by means of scanning transmission electron microscopy (STEM) in combination with energy-disperse X-ray analysis (EDX) shows that there are no $SiO_2$ particles incorporated in the crystals. Since dendritic crystal forms are generally developed only when there is no interference to the spatial propagation of crystal growth, it must be assumed that there were appropriately large pores present during crystallization. In the dried, surface-silylated aerogel, however, these pores can be demonstrated only indirectly by the presence of such crystals. If silylation is carried out without dissolved NaCl in the wet gel, then such pores cannot be detected. Furthermore, such pores cannot be detected in the wet gel either. Pores of this size appear, therefore, to form reversibly in the course of silylation if no salts are able to crystallize out. If salts crystallize out, the formation of such pores is irreversible.

The formation of such large pores (up to several hundred μm in size) is able to accelerate greatly the normally very slow exchange of substances in the pores of the wet gels, these pores being only a few nanometers in size. This permits much more rapid silylation and much more rapid solvent exchange than known from the prior art.

Furthermore, it is possible to reduce the internal surface area owing to the concentration of sodium chloride in the wet gel. This leads overall to a reduction in the organic surface groups per unit mass or volume of aerogel but without thereby necessarily a reduction in the degree of coverage (see Table 1, Example 7d, Experiment 1 to 8).

Drying as described in step c) produces aerogels having a sodium chloride content of between 0% by weight and 50% by weight, preferably between 0% by weight and 20% by weight and, with particular preference, between 0% by weight and 10% by weight.

In addition, the aerogel particles are totally or partly hydrophobic depending on the degree of silylation. The hydrophobicity is permanent.

Depending on the degree of modification, the aerogels produced by the novel processes described above are totally or partly hydrophobic. The hydrophobicity is permanent. As a result of the process, the internal surface of the resultant aerogels carries only Si—R and/or Si—OH groups but no Si—OR groups.

In accordance with the process the hydrogels described above have Si—OH groups on their internal surface. As a result of the particularly preferred, novel organic modification by means of trialkylchlorosilanes and/or hexalkyldisiloxanes there is complete or partial reaction of the Si—OH groups on the internal surface to give Si—O—Si(R)$_3$ groups. Since the wet gel does not come into contact with reactive solvents such as alcohols (methanol, ethanol, isopropanol, etc.), ketones (acetone, etc.), ethers (dimethoxyethane, etc.) or tetrahydrofuran throughout the entire process, in contrast to the prior art, formation of Si—OR groups on the internal surface of the gels is not possible.

The presence of organic solvents during actual silylation leads to the addition of organic solvent onto the reactive OH groups of the gel. This prevents the possibility of complete reaction of the OH groups with the respective silylating agent.

If, as in the present invention, the use of organic solvents is completely dispensed with, then all Si—OH groups which can be reached spatially by the silylating agent used are able to react with the silylating agent. By this means it is possible to achieve a very high degree of coverage of the internal surface, which is close to the theoretically possible degree of coverage. This can likewise be supported by the fact that the silylation methods described herein, in contrast to the prior art, enable a large excess of reactive silylating agents to be introduced in the pores of the hydrogel. By this means, the equilibrium of the silylation reaction can be shifted completely to the side of the modified surface.

By degree of coverage is meant in this application the number of organic surface groups per square nanometer of internal surface area of the aerogels.

Below, the degree of coverage is described using trimethylsilyl-modified aerogels as example, but without being restricted by this.

Given an even surface, the surface modification of porous $SiO_2$ materials with trimethylchlorosilane can theoretically result in a maximum degree of coverage with trimethylsilyl groups (TMS) of 2.8 $nm^{-2}$. This can be calculated from the steric bulk of the TMS units, which is described in the literature as the umbrella effect. From the Si—C (0.189 nm) and the C—H (0.108 nm) bond lengths and from the van der Waals radius of the TMS molecule the required space works out at about 0.36 $nm^2$ per TMS molecule. When converted this corresponds to the degree of coverage of 2.8 TMS molecules per $nm^2$ (W. Urbaniak, F. Janowski, B. Marciniec, F. Wolf, React. Kinet. Catal. Lett. 1987, 34,129; K.K. Unger, Journal of Chromatography Library 1979, 16, 64; E. V. Broun, A. Ya. Korolev, L. M. Vinogradova, R. V. Artamonova, T. V. Men'kova, Russ. J. Phys. Chem. 1970,44,442).

Table 1 lists the degrees of coverage for aerogels produced by the process of the invention.

Table 2 lists the degrees of coverage for aerogels produced by the process known from the prior art.

These degrees of coverage have been calculated using the following formula:

Degree of coverage =$([C]/[BET])*K$; units: $[nm^{-2}]$, $K=6.022*10^{23}/100*12*3*10^{18}=167.28$; units: $[g^{-1}]$

[C]: C content in % by weight

[BET]: BET surface area; units: $[m^2/g]$

Owing to the measurement methods used the values for the degrees of coverage are subject to errors of not more than 10%.

TABLE 1

Degrees of coverage for aerogels produced in accordance with the invention

| Example | C content [% by wt.] | BET surface area [$m^2/g$] | Degree of coverage [$nm^{-2}$] | NaCl content [% by wt.] |
|---|---|---|---|---|
| 2n | 12.4 | 684 | 3.0 | — |
| 3c | 11.7 | 683 | 2.9 | — |
| 4f | 11.5 | 730 | 2.6 | — |
| 5a, Expt. 1 | 12 | 732 | 2.7 | — |
| 5a, Expt. 2 | 11.7 | 683 | 2.9 | — |
| 5a, Expt. 3 | 11.6 | 701 | 2.8 | — |
| 5b | 12.0 | 732 | 2.7 | — |
| 7a, Expt. 1 | 10.4 | 614 | 2.8 | 7.1 |
| 7a, Expt. 2 | 9.4 | 560 | 2.8 | 6.9 |
| 7a, Expt. 3 | 8.9 | 568 | 2.6 | 6.9 |
| 7b | 9.3 | 587 | 2.7 | 4.3 |
| 7c | 9.0 | 558 | 2.7 | 6.4 |
| 7d, Expt. 1 | 9.2 | 549 | 2.8 | 8.4 |
| 7d, Expt. 2 | 7.1 | 422 | 2.8 | 18.0 |
| 7d, Expt. 3 | 6.9 | 431 | 2.7 | 11.4 |
| 7d, Expt. 4 | 7.8 | 431 | 3.0 | 12.8 |
| 7d, Expt. 5 | 6.8 | 425 | 2.7 | 18.6 |
| 7d, Expt. 6 | 7.3 | 431 | 2.8 | 16.3 |
| 7d, Expt. 7 | 7.0 | 405 | 2.9 | 20.1 |
| 7d, Expt. 8 | 9.6 | 570 | 2.8 | 5.6 |
| 8, Expt. 1 | 11.7 | 684 | 2.9 | — |
| 8, Expt. 2 | 11.0 | 606 | 3.0 | — |
| 8, Expt. 3 | 11.7 | 695 | 2.8 | — |
| 8, Expt. 4 | 11.0 | 630 | 2.9 | — |
| 9a | 12.0 | 673 | 3.0 | — |
| 9b | 9.5 | 488 | 3.3 | — |

TABLE 2

Degrees of coverage for aerogels produced in accordance with the prior art

| Comparative Example | C content [% by wt.] | BET surface area [$m^2/g$] | Degree of coverage [$nm^{-2}$] |
|---|---|---|---|
| 1 | 5.9 | 416 | 2.4 |
| 2, Expt. 1 | 9.6 | 689 | 2.3 |
| 2, Expt. 2 | 8.5 | 602 | 2.4 |
| 3, Expt. 1 | 6.9 | 719 | 1.6 |
| 3, Expt. 2 | 3.9 | 374 | 1.7 |
| 3, Expt. 3 | 4.0 | 375 | 1.8 |
| 3, Expt. 4 | 4.9 | 442 | 1.9 |
| 3, Expt. 5 | 7.0 | 615 | 1.9 |
| 3, Expt. 6 | 5.8 | 653 | 1.5 |
| 4, Expt. 1 | 4.3 | 365 | 2.0 |
| 4, Expt. 2 | 5.8 | 437 | 2.2 |
| 4, Expt. 3 | 4.3 | 353 | 2.0 |
| 4, Expt. 4 | 6.5 | 503 | 2.2 |
| 4, Expt. 5 | 5.7 | 489 | 2.0 |
| 4, Expt. 6 | 5.0 | 440 | 1.9 |
| 4, Expt. 7 | 4.6 | 414 | 1.9 |
| 4, Expt. 8 | 3.7 | 375 | 1.7 |
| 4, Expt. 9 | 4.0 | 366 | 1.8 |
| 4, Expt. 10 | 4.5 | 357 | 2.1 |
| 4, Expt. 11 | 4.9 | 407 | 2.0 |
| 4, Expt. 12 | 4.6 | 404 | 1.9 |
| 4, Expt. 13 | 5.6 | 442 | 2.1 |
| 4, Expt. 14 | 4.9 | 420 | 2.0 |
| 4, Expt. 15 | 5.7 | 419 | 2.3 |

TABLE 2-continued

Degrees of coverage for aerogels produced in accordance with the prior art

| Comparative Example | C content [% by wt.] | BET surface area [m$^2$/g] | Degree of coverage [nm$^{-2}$] |
|---|---|---|---|
| 4, Expt. 16 | 5.6 | 409 | 2.3 |
| 4, Expt. 17 | 5.6 | 435 | 2.2 |
| 4, Expt. 18 | 4.6 | 391 | 2.0 |
| 4, Expt. 19 | 7.1 | 536 | 2.2 |
| 4, Expt. 20 | 2.7 | 721 | 0.6 |
| 4, Expt. 21 | 5.9 | 546 | 1.8 |
| 4, Expt. 22 | 5.2 | 407 | 2.1 |
| 4, Expt. 23 | 6.4 | 451 | 2.4 |
| 4, Expt. 24 | 5.6 | 427 | 2.2 |
| 4, Expt. 25 | 5.7 | 417 | 2.3 |
| 4, Expt. 26 | 5.3 | 392 | 2.3 |
| 5 | 10.7 | 771 | 2.3 |

The internal surface area here is determined by means of nitrogen adsorption in accordance with the method of Brunauer, Emmett and Teller (BET). Since the BET method may lead to different results depending on the measurement parameters, the surface area must be determined by a fixed method. All BET surface areas stated in the present document were determined as follows.

The BET measurements were determined by means of a BET measuring device ASAP 2010 from Micromeritics by the multi-point BET measurement technique of DIN 66131. The sample amount used was about 0.2 g of aerogel. For sample preparation the aerogels were devolatilized under vacuum ($10^{-2}$ to $10^{-3}$ mbar) at 110° C. for at least 17 hours. Measurement was made at 77 kelvins, the temperature of liquid nitrogen. The specific surface area was determined from 5 measurement points within the relative pressure range (P/P$_0$) of from 0.05 to 0.25 of the adsorption isotherm. The required space for an N$_2$ molecule was assumed to be 0.162 nm$^2$. The measurement points were recorded at relative pressures of 0.05; 0.1; 0.15; 0.2 and 0.25 when the pressure fluctuations of the equilibrium pressure were not more than ±2%. The measurement method used to determine the internal surface area in accordance with BET gave a maximum error of 5% for a standardized sample (certified reference material, aluminum oxide type 150, CRM, BAM-PM-104, Bundesanstalt für Materialforschung und Prüfung [Federal Institute of Materials Research and Testing], Berlin).

The result found is a much higher degree of coverage, in the range from 2.6 to 3.3 TMS units per nm$^2$, for the aerogels produced in accordance with the invention (see Table 1). The degrees of coverage achievable in accordance with the prior art are in the range from 0.6 to 2.4.

The aerogels of the invention are used in particular as thermal insulation materials.

A further object of the present invention was to provide a process for producing organically modified lyogels, in which a conventional means is used for surface modification and where exchange of the water for a different solvent can be dispensed with.

This object is surprisingly achieved by a process for producing organically modified lyogels which comprises
a) introducing a hydrogel as initial charge and
b) subjecting the hydrogel obtained in step a) to surface modification.

The hydrogel obtained in step a) is preferably subjected to surface silylation.

The drying of the gels, as described above for producing aerogels, is omitted for the preparation of the corresponding lyogels.

The lyogels prepared have the same features in terms of their internal surface, hydrophobicity and degree of coverage as the dried aerogels.

Differences exist only with respect to the medium which is present in the pores.

The medium which is present in the pores following surface modification or silylation can be exchanged for any other medium. Preference is given to a hydrophilic medium such as ethanol or water, for example. Water is particularly preferred. In the case of water this can take place, for example, as follows.

Some or all of the original medium in the pores is exchanged for water—directly if said medium is miscible with water or, if it is immiscible or of low miscibility with water, then with the aid of a solvent such as an alcohol, for example. This is of course also possible with lyogels whose surface has been moidified in another way.

The concentration of water in the pores of the lyogels is preferably between 50 and 1100% by weight, preferably from 50 to 80% by weight.

The resulting gels are, for example, hydrophobic, water-containing wet gels for a wide variety of applications.

The process of the invention for producing aerogels is described in more detail below with reference to working examples without being restricted thereby.

EXAMPLE 1

To 424 g of a 7.5% strength HCl-solution, cooled to 10° C., there are added dropwise 712 g of a sodium waterglass solution (containing 13% by weight SiO$_2$ and with an Na$_2$O:SiO$_2$ ratio of 1:3.3), likewise cooled to 10° C. A pH of 4.7 is established. The hydrogel which forms after a few seconds is aged at 85° C. for 30 minutes. It is then washed with 3 l of hot water.

a) 100 g of hydrogel are acidified slightly with a small amount of aqueous HCl (about 5% strength by weight HCl in the water of the hydrogel), and 200 g of hexamethyldisiloxane and 50 g of ethanol as solubilizer are added. After the mixture had been stirred at room temperature for 5 hours, 30 ml of aqueous phase were separated off. After a further 24 hours of stirring at room temperature a further 10 ml of aqueous phase was separated off. Following the addition of a further 20 ml of ethanol as solubilizer and 3 days of stirring at room temperature, a further 45 ml of aqueous phase were separated off. The gel is then dried in a stream of hot nitrogen (1500 l/h, 200° C.) for one hour. The resulting aerogel has a density of 0.14 g/cm$^3$. The BET specific surface area is 665 m$^2$/g. The λ value is 0.016 W/mK.

b) 100 g of hydrogel are acidified slightly with a small amount of aqueous HCl (about 2% strength by weight HCl in the water of the hydrogel), and 200 g of hexamethyidisiloxane (HMDSO) are added. After 10 days at room temperature an aqueous phase forms below the HMDSO phase. The gel is then dried in a stream of hot nitrogen (1500 l/h, 200° C.) for one hour. The resulting aerogel has a density of 0.13 g/cm$^3$. The BET specific surface area is 680 m$^2$/g. The λ value is 0.015 W/mK.

EXAMPLE 2

2 l of a sodium waterglass solution (SiO$_2$ content of 6% by weight and Na$_2$O:SiO$_2$ ratio of 1:3.3) are passed (about 70 mvmin) through a jacketed glass column (length=100 cm, diameter=8 cm) which is packed with 4 l of an acidic ion exchanger resin (styrene-divinylbenzene copolymer with sulfonic acid groups, commercially available under the name ®Duolite C 20). The column is operated at a temperature of about 7° C. The silica solution which runs off at the bottom end of the column has a pH of 2.3. This solution is brought to a pH of 4.7 for polycondensation with a 1.0 molar NaOH solution and is then aged at 85° C. for 3 hours.

a) 150 g of hydrogel are washed with concentrated aqueous HCl until the water in the gel pores has an HCl concentration of 10% by weight. For the silylation, 1 l of hexamethyidisiloxane (HMDSO) are heated to boiling in a flask and are passed over the wet gel (150 g), which is heated to 80° C., over the course of about 30 minutes with the aid of a stream of hot nitrogen (50 l/h, 100° C.). The gel is then dried in a stream of hot nitrogen (1500 l/h, 200° C.) for one hour. The resulting aerogel has a density of 0.12 g/cm$^3$. The BET specific surface area is 677 m$^2$/g. The $\lambda$ value is 0.016 W/mK.

b) 150 g of hydrogel are washed with concentrated aqueous HCl until the water in the gel pores has an HCl concentration of 10% by weight. For the silylation, 1 l of hexamethyldisiloxane (HMDSO) are heated to boiling in a flask and are passed over the wet gel (150 g), which is heated to 80° C., over the course of about 30 minutes. The gel is then dried in a stream of hot nitrogen (1500 l/h, 200° C.) for one hour. The resulting aerogel has a density of 0.14 g/cm$^3$. The BET specific surface area is 654 m$^2$/g. The $\lambda$ value is 0.015 W/mK.

c) 150 g of hydrogel are washed with concentrated aqueous HCl until the water in the gel pores has an HCl concentration of, 15% by weight. For the silylation, 1 l of hexamethyidisiloxane (HMDSO) are heated to boiling in a flask and are passed over the wet gel (150 g), which is heated to 80° C., over the course of about 30 minutes. The gel is then dried in a stream of hot nitrogen (1500 l/h, 200° C.) for one hour. The resulting aerogel has a density of 0.11 g/cm$^3$. The BET specific surface area is 689 m$^2$/g. The $\lambda$ value is 0.013 W/mK.

d) 150 g of hydrogel are washed with concentrated acetic acid until the water in the gel pores has an acetic acid concentration of approximately 15% by weight. For the silylation, 1 l of hexamethyidisiloxane (HMDSO) are heated to boiling in a flask and are passed over the wet gel (150 g), which is heated to 80° C., over the course of about 30 minutes. The gel is then dried in a stream of hot nitrogen (1500 l/h, 200° C.) for one hour. The resulting aerogel has a density of 0.14 g/cm$^3$. The BET specific surface area is 644 m$^2$/g. The $\lambda$ value is 0.015 W/mK.

e) For the silylation, 1 l of hexamethyidisiloxane (HMDSO) and 100 ml of concentrated HCl solution are heated to boiling in a flask and are passed over a wet gel (150 ml) which is heated at 80° C. with the aid of a stream of hot nitrogen (50 l/h, 100° C.), over the course of about 30 minutes. The gel is then dried in a stream of hot nitrogen (1500 /h, 200° C.) for one hour. The resulting transparent aerogel has a density of 0.13 g/cm$^3$. The BET specific surface area is 680 m$^2$/g. The $\lambda$ value is 0.015 W/mK.

f) For the silylation, 1 l of hexamethyldisiloxane (HMDSO) and 100 ml of concentrated HCl solution are heated to boiling in a flask and the gas mixture which forms is passed over the wet gel (150 ml) which is heated at 80° C. The gel is then dried in a stream of hot nitrogen (1500 l/h, 200° C.) for one hour. The resulting transparent aerogel has a density of 0.12 g/cm$^3$. The BET specific surface area is 670 m$^2$/g. The $\lambda$ value is 0.013 W/mK.

g) For the silylation, 1 l of hexamethyldisiloxane (HMDSO) and 10 ml of concentrated HCl solution are heated to boiling in a flask and are passed over the wet gel (150 ml) which is heated at 80° C. with the aid of a stream of hot nitrogen (50 l/h, 100° C.), over the course of about 30 minutes. The gel is then dried in a stream of hot nitrogen (1500 l/h, 200° C.) for one hour. The resulting transparent aerogel has a density of 0.16 g/cm$^3$. The BET specific surface area is 625 m$^2$/g. The $\lambda$ value is 0.015 W/mK.

h) For the silylation, 1 l of hexamethyidisiloxane (HMDSO) and 10 ml of concentrated HCl solution are heated to boiling in a flask and the gas mixture which forms is passed over the wet gel (150 ml) which is heated at 80° C. The gel is then dried in a stream of hot nitrogen (1500 l/h, 200° C.) for one hour. The resulting transparent aerogel has a density of 0.135 g/cm$^3$. The BET specific surface area is 672 m$^2$/g. The $\lambda$ value is 0.013 W/mK.

i) For the silylation, 1 l of trimethylchlorosilane (TMCS) is heated to boiling in a flask and is passed over the wet gel (150 ml) which is heated at 80° C. with the aid of a stream of hot nitrogen (50 l/h, 100° C.), over the course of about 30 minutes. The gel is then dried in a stream of hot nitrogen (1500 l/h, 200° C.) for one hour. The resulting transparent aerogel has a density of 0.11 g/cm$^3$. The BET specific surface area is 685 m$^2$/g. The $\lambda$ value is 0.013 W/mK.

j) For the silylation, 1 l of trimethylchlorosilane (TMCS) is heated to boiling in a flask and the gas which forms is passed over the wet gel (150 ml) which is heated at 80° C. The gel is then dried in a stream of hot nitrogen (1500 l/h, 200° C.) for one hour. The resulting transparent aerogel has a density of 0.115 g/cm$^3$. The BET specific surface area is 615 m$^2$/g. The $\lambda$ value is 0.013 W/mK.

k) For the silylation, 1 l of hexamethyidisiloxane (HMDSO) and 100 ml of concentrated acetic acid are heated to boiling in a flask and are passed over the wet gel (150 ml) which is heated at 80° C. with the aid of a stream of hot nitrogen (50 l/h, 100° C.), over the course of about 30 minutes. The gel is then dried in a stream of hot nitrogen (1500 l/h, 200° C.) for one hour. The resulting transparent aerogel has a density of 0.15 g/cm$^3$. The BET specific surface area is 635 m$^2$/g. The $\lambda$ value is 0.014 W/mK.

l) For the silylation, 1 l of hexamethyldisiloxane (HMDSO) and 100 ml of concentrated acetic acid are heated to boiling in a flask and the gas mixture which forms is passed over the wet gel (150 ml) which is heated at 80° C. The gel is then dried in a stream of hot nitrogen (1500 l/h, 200° C.) for one hour. The resulting transparent aerogel has a density of 0.135 g/cm$^3$. The BET specific surface area is 673 m$^2$/g. The $\lambda$ value is 0.013 W/mK.

m) For the silylation, 1 l of trimethylsiloxane (Me$_3$SiOH) and 100 ml of concentrated HCl solution are heated to boiling in a flask and the gas mixture which forms is passed over the wet gel (150 ml) which is heated at 80° C. with the aid of a stream of hot nitrogen (50 l/h, 100° C.), over the course of about 30 minutes. The gel is then dried in a stream of hot nitrogen (1500 l/h, 200° C.) for one hour. The resulting transparent aerogel has a density of 0.13 g/cm$^3$. The BET specific surface area is 645 m$^2$/g. The $\lambda$ value is 0.015 W/mK.

n) To 424 g of a 7.5% strength HCl solution, which has been cooled to 10° C., there are added dropwise 712 g of a sodium waterglass solution (containing 13% by weight $SiO_2$ and with an $Na_2O:SiO_2$ ratio of 1:3.3), likewise cooled to 10° C. A pH of 4.7 is established. The hydrogel which forms after several seconds is aged at 85° C. for 30 minutes. It is then washed with 3 l of hot water. For the silylation, 1 l of hexamethyidisiloxane (HMDSO) and 100 ml of concentrated HCl solution are heated to boiling in a flask and are passed over the wet gel (150 ml), which is heated at 80° C., over the course of about 30 minutes with the aid of a stream of hot nitrogen (50 l/h, 100° C.). The gel is then dried in a stream of hot nitrogen (1500 l/h, 200° C.) for one hour.

Result:

|  | Experiment 1 |
| --- | --- |
| Density [kg/m³] | 124 |
| C content [% by wt.] | 12.4 |
| BET surface area [m²/g] | 684 |
| Thermal conductivity [mW/mK] | 14 |

EXAMPLE 3

To 424 g of a 7.5% strength HCl solution, which has been cooled to 10° C., there are added dropwise 712 g of a sodium waterglass solution (containing 13% by weight $SiO_2$ and with an $Na_2O:SiO_2$ ratio of 1:3.3), likewise cooled to 10° C. A pH of 4.7 is established. The hydrogel which forms after several seconds is aged at 85° C. for 30 minutes. It is then washed with 3 l of hot water.

a) 100 g of hydrogel are washed with concentrated aqueous HCl until the water in the gel pores has become 10% strength by weight of HCl. For silylation, 250 g of hexamethyidisiloxane are added to the hydrogel and the mixture is heated at 80° C. for 4 hours. In the course of heating, an aqueous phase of about 90 g forms below the HMDSO phase. The hydrophobicized gel is removed from the HMDSO phase and dried. Drying takes place in a stream of hot nitrogen (1500 l/h, 200° C.) for one hour. The resulting aerogel has a density of 0.12 g/cm³. The BET specific surface area is 676 m²/g. The λ value is 0.013 W/mK.

b) 100 g of hydrogel are washed with concentrated aqueous HCl until the water in the gel pores has become 15% strength by weight of HCl. For silylation, 250 g of hexamethyldisiloxane are added to the hydrogel and the mixture is heated at 80° C. for 2 hours. In the course of heating, an aqueous phase of about 100 g forms below the HMDSO phase. The hydrophobicized gel is removed from the HMDSO phase and dried. Drying takes place in a stream of hot nitrogen (1500 l/h, 200° C.) for one hour. The resulting aerogel has a density of 0.11 g/cm³. The BET specific surface area is 678 m²/g. The λ value is 0.013 W/mK.

c) 100 g of hydrogel are washed with concentrated aqueous HCl until the water in the gel pores has become 20% strength by weight of HCl. For silylation, 250 g of hexamethyidisiloxane are added to the hydrogel and the mixture is heated at 80° C. for 1.5 hours. In the course of heating, an aqueous phase of about 100 g forms below the HMDSO phase. The hydrophobicized gel is removed from the HMDSO phase and dried. Drying takes place in a stream of hot nitrogen (1500 l/h, 200° C.) for one hour.

Result:

|  | Experiment 1 |
| --- | --- |
| Density [kg/m³] | 126 |
| C content [% by wt.] | 11.7 |
| BET surface area [m²/g] | 683 |
| Thermal conductivity [mW/mK] | 13.5 | d) 100 g of hydrogel are washed with concentrated aqueous HCl until the water in the gel pores has become 20% strength by weight of HCl. For silylation, 250 g of hexamethyidisiloxane are added to the hydrogel and the mixture is heated at 60° C. for 3 hours. In the course of heating, an aqueous phase of about 80 g forms below the HMDSO phase. The hydrophobicized gel is removed from the HMDSO phase and dried. Drying takes place in a stream of hot nitrogen (1500 l/h, 200° C.) for one hour. The resulting aerogel has a density of 0.13 g/cm³. The BET specific surface area is 645 m²/g. The λ value is 0.012 W/mK.

EXAMPLE 4

2 l of a sodium waterglass solution ($SiO_2$ content of 6% by weight and $Na_2O:SiO_2$ ratio of 1:3.3) are passed (about 70 ml/min) through a jacketed glass column (length=100 cm, diameter=8 cm) which is packed with 4 l of an acidic ion exchanger resin (styrenedivinylbenzene copolymer with sulfonic acid groups, commercially available under the name ®Duolite C 20). The column is operated at a temperature of about 7° C. The silica solution which runs off at the bottom end of the column has a pH of 2.3.

This solution is brought to a pH of 4.7 for polycondensation with a 1.0 molar NaOH solution and is then aged at 85° C. for 3 hours.

a) For silylation, 105 g of trimethylchlorosilane (140 ml) are added to 100 g of hydrogel. With vigorous evolution of gas (HCl) an aqueous phase (120 ml of concentrated HCl) forms below the HMDSO phase. After 15 minutes the hydrophobicized gel is removed from the HMDSO phase (106 ml of HMDSO) and dried. Drying takes place in a stream of hot nitrogen (1500 l/h, 200° C.) for one hour. The resulting transparent aerogel has a density of 0.10 g/cm³. The BET specific surface area is 676 m²/g. The λ value is 0.011 W/mK.

b) For silylation, 100 g of hydrogel are suspended in 100 ml of hexamethyldisiloxane and the suspension is heated with 31.5 g of trimethylchlorosilane (42 ml) for 30 minutes under reflux. With evolution of gas (HCl) an aqueous phase forms over the course of 20 minutes below the HMDSO phase. The hydrophobicized gel is removed from the HMDSO phase and dried. Drying takes place in a stream of hot nitrogen (1500 l/h, 200° C.) for one hour. The resulting transparent aerogel has a density of 0.13 g/cm³. The BET specific surface area is 680 m²/g. The λ value is 0.013 W/mK.

c) For silylation, 100 g of hydrogel are suspended in 100 ml of hexamethyidisiloxane (HMDSO), and 52.5 g of trimethylchlorosilane (70 ml) are added. With evolution of gas (HCl) an aqueous phase forms below the HMDSO phase. After 25 minutes the hydrophobicized gel is removed from the HMDSO phase (153 ml of HMDSO)

and dried. Drying takes place in a stream of hot nitrogen (1500 l/h, 200° C.) for one hour. The resulting transparent aerogel has a density of 0.12 g/cm³. The BET specific surface area is 666 m²/g. The λ value is 0.013 W/mK.

d) For silylation, 100 g of hydrogel are suspended in 100 ml of hexamethyldisiloxane (HMDSO), and 105 g of trimethylchlorosilane (140 ml) are added. With vigorous evolution of gas (HCl) an aqueous phase (120 ml of concentrated HCl) forms below the HMDSO phase. After 15 minutes the hydrophobicized gel is removed from the HMDSO phase (206 ml of HMDSO) and dried. Drying takes place in a stream of hot nitrogen (1500 l/h, 200° C.) for one hour. The resulting transparent aerogel has a density of 0.10 g/cm³. The BET specific surface area is 676 m²/g. The λ value is 0.011 W/mK.

e) For silylation, 100 g of hydrogel are suspended in 100 ml of hexamethyidisiloxane (HMDSO), and 1050 g of trimethylchlorosilane (10 mol) are added. With vigorous evolution of gas (HCl) the gel is hydrophobicized. After 10 minutes the hydrophobicized gel is removed from the HMDSO phase (4.5 mol of HMDSO) and dried. Drying takes place in a stream of hot nitrogen (1500 1/h, 200° C.) for one hour. The resulting transparent aerogel has a density of 0.10 g/cm³. The BET specific surface area is 676 m²/g. The λ value is 0.011 W/mK.

f) The hydrogel is washed with concentrated aqueous Hcl solution until the water in the pores of the gel has become a 10% strength HCl solution. For silylation, 100 g of this hydrogel are suspended in 100 ml of hexamethyidisiloxane and 31.5 g of trimethylchlorosilane (42 ml) are added. With evolution of gas (HCl) an aqueous phase forms within the course of an hour below the HMDSO phase. The hydrophobicized gel is removed from the HMDSO phase and dried. Drying takes place in a stream of hot nitrogen (1500 l/h, 200° C.) for one hour.
Result:

|  | Experiment 1 |
| --- | --- |
| Density [kg/m³] | 101 |
| C content [% by wt.] | 11.5 |
| BET surface area [m²/g] | 730 |
| Thermal conductivity [mW/mK] | 13 |

EXAMPLE 5

To 424 g of a 7.5% strength HCl solution, which has been cooled to 10° C., there are added dropwise 712 g of a sodium waterglass solution (containing 13% by weight SiO₂ and with an Na₂O:SiO₂ ratio of 1:3.3), likewise cooled to 10° C. A pH of 4.7 is established. The hydrogel which forms after several seconds is aged at 85° C. for 30 minutes. It is then washed with 3 l of hot water.

a) The hydrogel is washed with concentrated aqueous HCl solution until the water in the pores of the gel has become a 15% strength HCl solution.
For silylation, 100 g of this hydrogel are suspended in 100 ml of hexamethyidisiloxane and the suspension is heated under reflux with 31.5 g of trimethylchlorosilane (42 ml). With evolution of gas (HCl) an aqueous phase forms below the HMDSO phase. The hydrophobicized gel is removed from the HMDSO phase and dried. Drying takes place in a stream of hot nitrogen (1500 1 /h, 200° C.) for one hour.

Result:

|  | Experiment 1 | Experiment 2 | Experiment 3 |
| --- | --- | --- | --- |
| Density [kg/m³] | 132 | 122 | 118 |
| C content [% by wt.] | 12.0 | 11.7 | 11.6 |
| BET surface area [m²/g] | 732 | 683 | 701 |
| Thermal conductivity [mW/mK] | 13 | — | — | b) For silylation, 100 g of hydrogel are suspended in 100 ml of hexamethyldisiloxane (HMDSO), and 105 g of trimethylchlorosilane (140 ml) are added. With vigorous evolution of gas (HCl) an aqueous phase (120 ml of concentrated HCl) forms below the HMDSO phase. After 15 minutes the hydrophobicized gel is removed from the HMDSO phase (206 ml of HMDSO) and dried. Drying takes place in a stream of hot nitrogen (1500 l/h, 200° C.) for one hour.
Result:

|  | Experiment 1 |
| --- | --- |
| Density [kg/m³] | 152 |
| C content [% by wt.] | 12.0 |
| BET surface area [m²/g] | 732 |
| Thermal conductivity [mW/mK] | 14 |

EXAMPLE 6

2 l of a sodium waterglass solution (SiO₂ content of 6% by weight and Na₂O:SiO₂ ratio of 1:3.3) are passed (about 70 ml/min) through a jacketed glass column (length=100 cm, diameter=8 cm) which is packed with 4 l of an acidic ion exchanger resin (styrenedivinylbenzene copolymer with sulfonic acid groups, commercially available under the name ®Duolite C 20). The column is operated at a temperature of about 7° C. The silica solution which runs off at the bottom end of the column has a pH of 2.3.

This solution is brought to a pH of 4.7 for polycondensation with a 1.0 molar NaOH solution and is then aged at 85° C. for 3 hours.

a) HCl gas is passed through 100 g of hydrogel until a uniform concentration of approximately 15% by weight of aqueous HCl solution is established in the gel (about 5 minutes). Owing to the heat of dissolution the gel becomes so hot that some water is evaporated and the wet gel shrinks by about 10 to 20% by volume. The hydrogel is then dry on the outer surface.
For silylation, 250 g of hexamethyldisiloxane are added to the hydrogel and the mixture is heated at 80° C. for 2 hours. In the course of heating, an aqueous phase of about 100 g forms below the HMDSO phase.
The hydrophobicized gel is removed from the HMDSO phase and dried. Drying takes place in a stream of hot nitrogen (1500 l/h, 200° C.) for one hour. The resulting aerogel has a density of 0.12 g/cm³. The BET specific surface area is 666 m²/g. The λ value is 0.014 W/mK.

b) HCl gas is passed through 100 g of hydrogel until a uniform concentration of approximately 15% by weight of aqueous HCl solution is established in the gel (about 5 minutes). Owing to the heat of dissolution the gel becomes so hot that some water is evaporated and the wet gel shrinks by about 10 to 20% by volume. The hydrogel is then dry on the outer surface.

For silylation, the hydrogel is suspended in 100 ml of hexamethyidisiloxane, and 31.5 g of trimethylchlorosilane (42 ml) are added. An aqueous, HCl-containing phase forms within the course of one hour below the HMDSO phase.

The hydrophobicized gel is removed from the HMDSO phase and dried. Drying takes place in a stream of hot nitrogen (1500 l/h, 200° C.) for one hour. The resulting transparent aerogel has a density of 0.12 g/cm$^3$.

The BET specific surface area is 656 m$^2$/g. The λ value is 0.013 W/mK.

EXAMPLE 7

To 424 g of a 7.5% strength HCl solution, which has been cooled to 10° C., there are added dropwise 712 g of a sodium waterglass solution (containing 13% by weight SiO$_2$ and with an Na$_2$O:SiO$_2$ ratio of 1:3.3), likewise cooled to 10° C. A pH of 4.7 is established. The hydrogel which forms after several seconds is aged at 85° C. for 30 minutes and treated as follows.

a) 300 ml of concentrated aqueous HCl solution are passed slowly through 150 g of NaCl-containing hydrogel. After the aqueous solution has drained off the acidified hydrogel is suspended in 100 g of HMDSO for silylation, and 40 g of TMCS are added. After 30 minutes the hydrophobicized gel is removed from the HMDSO phase and dried. Drying takes place in a stream of hot nitrogen (1500 l/h, 200° C.) for one hour.
Result:

|  | Experiment 1 | Experiment 2 | Experiment 3 |
| --- | --- | --- | --- |
| Density [kg/m$^3$] | 110 | 122 | 130 |
| C content [% by wt.] | 10.4 | 9.4 | 8.9 |
| BET surface area [m$^2$/g] | 614 | 560 | 568 |
| NaCl content [% by wt.] | 7.1 | 6.9 | 6.9 | b) 300 ml of semi-concentrated aqueous HCl solution are passed slowly through 150 g of NaCl-containing hydrogel. After the aqueous solution has drained off the acidified hydrogel is suspended in 100 g of HMDSO for silylation, and 40 g of TMCS are added. After 60 minutes the hydrophobicized gel is removed from the HMDSO phase and dried. Drying takes place in a stream of hot nitrogen (1500 l/h, 200° C.) for one hour.
Result:

|  | Experiment 1 |
| --- | --- |
| Density [kg/m$^3$] | 119 |
| C content [% by wt] | 9.3 |
| BET surface area [m$^2$/g] | 587 |
| NaCl content [% by wt.] | 4.3 | c) 1 liter of concentrated aqueous HCl solution is passed slowly through 150 g of NaCl-containing hydrogel. After the aqueous solution has drained off the acidified hydrogel is suspended in 100 g of HMDSO for silylation, and 40 g of TMCS are added. After 30 minutes the hydrophobicized gel is removed from the HMDSO phase and dried. Drying takes place in a stream of hot nitrogen (1500 l/h, 200° C.) for one hour.
Result:

|  | Experiment 1 |
| --- | --- |
| Density [kg/m$^3$] | 114 |
| C content [% by wt] | 9.0 |
| BET surface area [m$^2$/g] | 558 |
| NaCl content [% by wt.] | 6.4 | d) HCl gas is passed through 100 g of NaCl-containing hydrogel until a uniform concentration of approximately 15% by weight of aqueous HCl solution is established in the gel (about 5 minutes). Owing to the heat of dissolution the gel becomes so hot that some water is evaporated and the wet gel shrinks by about 10 to 20% by volume. The hydrogel is subsequently dry on the outer surface.

Experiments 1, 2, 3 and 4
For silylation, the hydrogel is suspended in 100 ml of hexamethyidisiloxane, and 31.5 g of trimethylchlorosilane are added.

Experiment 5
For silylation, the hydrogel is suspended in 100 ml of hexamethyldisiloxane, and 120 g (1.1 mol) of trimethylchlorosilane are added.

Experiments 6 and 7:
For silylation, the hydrogel is suspended in 100 ml of hexamethyldisiloxane, and 140 g (1.4 mol) of trimethylchlorosilane are added.

Experiment 8
For silylation, 250 g of hexamethyldisiloxane are added to the hydrogel and the mixture is heated at 80° C. for 2 hours.
Results:

|  | Expt. 1 | Expt. 2 | Expt. 3 | Expt. 4 | Expt. 5 | Expt. 6 | Expt. 7 | Expt. 8 |
| --- | --- | --- | --- | --- | --- | --- | --- | --- |
| Density [kg/m$^3$] | 125 | 150 | 144 | 144 | 140 | 130 | 130 | 140 |
| C content [% by wt.] | 9.2 | 7.1 | 6.9 | 7.8 | 6.8 | 7.3 | 7.0 | 9.6 |
| BET surface area [m$^2$/g] | 549 | 422 | 431 | 431 | 425 | 431 | 405 | 570 |
| NaCl content [% by wt.] | 8.4 | 18.0 | 11.4 | 12.8 | 18.6 | 16.3 | 20.1 | 5.6 |

In all experiments, the hydrophobicized gel is removed from the HMDSO phase after 30 minutes and dried. Drying takes place in a stream of hot nitrogen (1500 l/h, 200° C. for one hour.

EXAMPLE 8

To 641 g (35.6 mol) of water cooled to 7° C. there are added slowly dropwise 135 g (0.8 mol. 91.2 ml) of silicon tetrachloride (SiCl$_4$) (cooled to 7° C.). The wet gel which forms, and in doing so gives off heat, has a calculated SiO$_2$ concentration of 6.1% by weight.

The gel is aged for 30 minutes in Experiments 1, 2 and 3 and for 2 hours in Experiment 4 at 50° C.

For silylation, 100 g of hydrogel are suspended in 100 ml of hexamethyldisiloxane (HMDSO), and 52.5 g (0.5 mol, 70 ml) of trimethylchlorosilane are added. Within a few minutes an aqueous phase forms below the HMDSO phase. After 30 minutes the hydrophobicized, HMDSO-moist gel is removed from the HMDSO phase and dried. Drying takes place in a stream of hot nitrogen (1500 l/h, 200° C.) for one hour.

Result:

|  | Experiment 1 | Experiment 2 | Experiment 3 | Experiment 4 |
|---|---|---|---|---|
| Density [kg/m$^3$] | 152 | 130 | 288 | 152 |
| C content [% by wt.] | 11.7 | 11.0 | 11.7 | 11.0 |
| BET surface area [m$^2$/g] | 684 | 606 | 695 | 630 |
| Thermal conductivity [mW/mK] | — | — | — | 13.2 |

EXAMPLE 9 a) To 424 g of a 7.5% strength HCl solution, which has been cooled to 10° C., there are added dropwise 712 g of a sodium waterglass solution (containing 13% by weight SiO$_2$ and with an Na$_2$O:SiO$_2$ ratio of 1:3.3), likewise cooled to 10° C. A pH of 4.7 is established. The hydrogel which forms after several seconds is aged at 85° C. for 30 minutes and then washed with 3 l of hot water. 100 g of hydrogel are suspended in 140 ml of hexamethyidisiloxane (HMDSO) and a stream of HCl gas (about 40 9) is passed through this suspension for 30 minutes. During this treatment the temperature of the suspension rises to 82° C. At the same time, 120 g of an aqueous HCl-containing phase are separated off. The hydrophobicized gel is removed from the HMDSO phase and dried. Drying takes place in a stream of hot nitrogen (1500 l/h, 200° C.) for one hour. The resulting aerogel has a density of 0.124 g/cm$^3$. The BET specific surface area is 673 m$^2$/g. The C content is 12.0% by weight.

b) To 424 g of a 7.5% strength HCl solution, which has been cooled to 10° C., there are added dropwise 712 g of a sodium waterglass solution (containing 13% by weight SiO$_2$ and with an Na$_2$O:SiO$_2$ ratio of 1:3.3), likewise cooled to 10° C. A pH of 4.7 is established. The hydrogel which forms after several seconds is aged at 85° C. for 30 minutes and then treated as follows. 100 g of the NaCl-containing hydrogel (4.3 g of NaCl in 100 g of hydrogel) are suspended in 150 ml of hexamethyidisiloxane (HMDSO) and a stream of HCl gas (about 46 g) is passed through this suspension for 45 minutes. During this treatment the temperature of the suspension rises to 75° C. At the same time, about 120 g of an aqueous HCl-containing phase are separated off. The hydrophobicized gel is removed from the HMDSO phase and dried. Drying takes place in a stream of hot nitrogen (1500 l/h, 200° C.) for one hour. The resulting aerogel has a density of 0.115 g/cm$^3$. The BET specific surface area is 488 m$^2$/g. The C content is 9.5% by weight. The NaCl concentration is 6.4% by weight based on the aerogel weight.

COMPARATIVE EXAMPLES

Comparative Example 1

(in accordance with U.S. Pat. No. 3,015,645 or GB-A-682,574)

70 g of HCl (25% by weight) are diluted with 180 g of water, cooled to 8° C. and introduced as initial charge. The waterglass solution (211.8 g of 33.33% by weight waterglass solution with an Na$_2$O:SiO$_2$ ratio of 1:3.3, diluted with 38.2 g of H$_2$O) is added slowly to the HCl solution with vigorous stirring. At a pH of 6.9 the mixture gels. After aging at room temperature for 30 minutes the gel is comminuted and washed with hot water until it is free from chloride ions (chloride ions in the gel 0.15% by weight). Subsequently, solvent exchange for acetone is carried out until the water content in the gel is <1% by weight. The acetone is then exchanged for carbon tetrachloride. 327 g of gel are suspended in carbon tetrachloride, and 262 g of trimethylchlorosilane (TMCS) are added for silylation. After boiling under reflux for 2 hours the silylated gel is washed free from excess TMCS with carbon tetrachloride and dried. Drying takes place in a stream of hot nitrogen (1500 l/h, 200° C.) for one hour.

Result:

| Density [kg/m$^3$] | 167 |
|---|---|
| C content [% by wt.] | 5.9 |
| BET surface area [m$^2$/g] | 416 |

Comparative Example 2

(in accordance with EP-A-0 658 513)

2 l of a sodium waterglass solution (containing 6% by weight SiO$_2$ and with an Na$_2$O:SiO$_2$ ratio of 1:3.3) are passed (about 70 mvmin) through a jacketed glass column (length=100 cm, diameter=8 cm) packed with 4 l of an acidic ion exchanger resin (styrenedivinylbenzene copolymer with sulfonic acid groups, obtainable commercially under the name ®Duolite C 20). The column is operated at a temperature of about 7° C. The silicic acid solution which runs off at the bottom end of the column has a pH of 2.3. For the polycondensation, this solution is brought to a pH of 4.7 using a 1.0 molar NaOH solution and then aged at 85° C. for 3 hours. The wet gel is washed with ethanol until all of the water has been exchanged for ethanol. It is then washed with n-heptane until all of the ethanol has been exchanged for n-heptane.

For silylation, 10% by weight of trimethylchlorosilane is added to 100 g of wet gel in n-heptane at 50° C. for 12 hours. The gel is then washed free from excess TMCS with n-heptane and dried. Drying takes place in a stream of hot nitrogen (1500 l/h, 200° C.) for one hour.

Result:

|  | Experiment 1 | Experiment 2 |
|---|---|---|
| Density [kg/m$^3$] | 130 | 150 |
| C content [% by wt.] | 9.6 | 8.5 |
| BET surface area [m$^2$/g] | 689 | 602 |

Comparative Example 3

(in accordance with DE-A-195 41 715)

707 g of a sodium waterglass solution (containing 17% by weight of SiO2 and with an $Na_2O:SiO_2$ ratio of 1:3.3), which has been cooled to 7° C., are added dropwise, with continual cooling to 0° C., to 236 g of 25% strength $H_2SO_4$ which has been cooled to 0° C. During this addition a pH of 1.6 is established. The $Na_2SO_4*10H_2O$ which precipitates is separated off from the silica sol at 0° C. with the aid of a suction filter, and the silica sol is diluted with 280 ml of $H_2O$. To the resulting silica sol there are added, at a temperature of 5° C. and with stirring, 26 ml of a 1 N NaOH solution, in order to establish a pH of 4.7. The resulting hydrogel is then aged at 85° C. for 2.5 hours and washed with 2 l of hot water and the water is extracted with acetone until the water content in the gel is below 2% by weight.

Experiments 1, 2 and 3

The acetone-containing gel is silylated at 50° C. for 3 hours with 5% by weight of trimethylchlorosilane (TMCS) and is washed with 2 l of acetone. Drying takes place in a stream of hot nitrogen (1500 l/h, 200° C.) for one hour.

Experiments 4, 5 and 6

The acetone-containing gel is silylated at 50° C. for 3 hours with 10% by weight of trimethylchlorosilane (TMCS) and is washed with 2 l of acetone. Drying takes place in a stream of hot nitrogen (1500 l/h, 200° C.) for one hour.

Result:

|  | Expt. 1 | Expt. 2 | Expt. 3 | Expt. 4 | Expt. 5 | Expt. 6 |
|---|---|---|---|---|---|---|
| Density [kg/m³] | 224 | 215 | 198 | 204 | 129 | 120 |
| C content [% by wt.] | 6.9 | 3.9 | 4.0 | 4.9 | 7.0 | 5.8 |
| BET surface area [m²/g] | 719 | 374 | 375 | 442 | 615 | 653 |

Comparative Example 4

(in accordance with DE-A-44 04 701 and DE-A-1 95 06 141)

2 l of a sodium waterglass solution (containing 6% by weight $SiO_2$ and with an $Na_2O:SiO_2$ ratio of 1:3.3) are passed (about 70 ml/min) through a jacketed glass column (length=100 cm, diameter=8 cm) packed with 4 l of an acidic ion exchanger resin (styrene-divinylbenzene copolymer with sulfonic acid groups, commercially obtainable under the name ®Duolite C 20). The column is operated at a temperature of about 7° C. The silicic acid solution which runs off at the bottom end of the column has a pH of 2.3. For the polycondensation, this solution is brought to a pH of 4.7 using a 1.0 molar NaOH solution and then is aged at 85° C. for 3 hours.

Experiments 1 to 10

The wet gel is extracted with acetone until the water content in the gel is below 2% by weight. The acetone-containing gel is silylated with 5% by weight of trimethylchlorosilane (TMCS), at 50° C. for 5 hours and washed with 2 l of acetone. Drying takes place in a stream of hot nitrogen (1500 l/h, 200° C.) for one hour.

Result:

| Experiment | 1 | 2 | 3 | 4 | 5 | 6 | 7 | 8 | 9 | 10 |
|---|---|---|---|---|---|---|---|---|---|---|
| Density [kg/m³] | 253 | 203 | 244 | 148 | 155 | 231 | 306 | 264 | 186 | 192 |
| C content [% by wt.] | 4.3 | 5.8 | 4.3 | 6.5 | 5.7 | 5.0 | 4.6 | 3.7 | 4.0 | 4.5 |
| BET surface area [m²/g] | 365 | 437 | 353 | 503 | 489 | 440 | 414 | 375 | 366 | 357 |

Experiments 11 to 20

The wet gel is extracted with acetone until the water content in the gel is below 2% by weight. The acetone-containing gel is silylated with 10% by weight of trimethylchlorosilane (TMCS), at 50° C. for 5 hours and washed with 2 l of acetone. Drying takes place in a stream of hot nitrogen (1500 l/h, 200° C.) for one hour.

Result:

| Experiment | 11 | 12 | 13 | 14 | 15 | 16 | 17 | 18 | 19 | 20 |
|---|---|---|---|---|---|---|---|---|---|---|
| Density [kg/m³] | 177 | 234 | 156 | 192 | 158 | 182 | 166 | 165 | 137 | 150 |
| C content [% by wt.] | 4.9 | 4.6 | 5.6 | 4.9 | 5.7 | 5.6 | 5.6 | 4.6 | 7.1 | 2.7 |
| BET surface area [m²/g] | 407 | 404 | 442 | 420 | 419 | 409 | 435 | 391 | 536 | 721 |

Experiments 21 to 26

The wet gel is extracted with isopropanol until the water content in the gel is below 2% by weight. The isopropanol-containing gel is silylated with 10% by weight of trimethylchlorosilane (TMCS), at 70° C. for 5 hours and washed in with 2 l of isopropanol. Drying takes place in a stream of hot nitrogen (1500 l/h, 200° C.) for one hour.

Result:

| Experiment | 21 | 22 | 23 | 24 | 25 | 26 |
|---|---|---|---|---|---|---|
| Density [kg/m³] | 220 | 214 | 164 | 182 | 247 | 237 |
| C content [% by wt.] | 5.9 | 5.2 | 6.4 | 5.6 | 5.7 | 5.3 |
| BET surface area [m²/g] | 546 | 407 | 451 | 427 | 417 | 392 |

Comparative Example 5

(in accordance with DE-A-1 96 31 267)

To 424 g of a 7.5% strength HCl solution, which has been cooled to 10° C., there are added dropwise 712 g of a sodium waterglass solution (containing 13% by weight of SiO₂ and with an Na₂O:SiO₂ ratio of 1:3.3), which has likewise been cooled to 10° C. A pH of 4.7 is established. The hydrogel which forms after a few seconds is aged at 85° C. for 30 minutes. It is then washed with 3 l of hot water. The wet gel is extracted with acetone until the water content in the gel is below 2% by weight. The acetone-containing gel is silylated with 5% by weight of trimethylchlorosilane (TMCS) at 50° C. for 5 hours and washed with 2 l of acetone. Drying takes place in a stream of hot nitrogen (1500 l/h, 200° C.) for one hour.

Result:

| Density [kg/m³] | 126 |
|---|---|
| C content [% by wt.] | 10.7 |
| BET surface area [m²/g] | 771 |

The thermal conductivities were measured using a hot wire method (see e.g. B. O. Nielsson, G. Rüischenpöhler, J. Groβ3, J. Fricke, High Temperatures—High Pressures, Vol. 21, 267-274 (1989)).

The process of the invention for producing wet gels can be described in more detail for producing aerogels on the basis of the working examples described, without being restricted thereby. The only difference is that in all examples the above-described drying is omitted.

The invention claimed is:

1. A process for preparing an organically modified aerogel, which comprises:
    a) introducing an inorganic hydrogel formed at pH greater than 3 as initial charge,
    b) modifying the surface of the hydrogel obtained in step a) by mixing the hydrogel with a silylating agent to form a hydrophobic surface modified gel, and
    c) drying the surface-modified gel obtained in step b) to form the organically modified aerogel.

2. The process according to claim 1, wherein the hydrogel obtained in step a) is aged before being surface-modified in step b).

3. The process as claimed in claim 1, wherein the silylating agent is used in liquid form and/or as a gas or vapor.

4. The process as claimed in claim 1, wherein the silylating agent employed comprises at least one silane of the formula $R_{4-n}{}^1SiCl_n$ or $R_{4-n}{}^1Si(OR^2)_n$ where n=1 to 4 and where $R^1$ and $R^2$ independently of one another are identical or different and are each a hydrogen atom or a nonreactive, organic, linear, branched, cyclic, saturated or unsaturated, aromatic or heteroaromatic radical.

5. The process as claimed in claim 4, wherein trimethylchlorosilane is employed as silylating agent.

6. The process as claimed in claim 1, wherein the silylating agent employed comprises at least one disiloxane of the formula I and/or one disilazane of the formula II

$$R_3Si-O-SiR_3 \quad (I)$$

$$R_3Si-N(H)-SiR_3 \quad (II)$$

where the radicals R, independently of one another, are identical or different and are each a hydrogen atom or a nonreactive, organic, linear, branched, cyclic, saturated or unsaturated, aromatic or heteroaromatic radical.

7. The process as claimed in claim 6, wherein the silylating agent employed in step b) is a symmetrical disiloxane.

8. The process as claimed in claim 6, wherein the silylating agent employed in step b) is disiloxane in which all radicals R are identical.

9. The process as claimed in claim 6, wherein the silylating agent employed is hexamethyldisiloxane.

10. The process as claimed in claim 1, wherein at least one acid and/or base is introduced as a catalyst in the hydrogel before surface modification.

11. The process as claimed in claim 10, wherein HCl is used as acid.

12. The process as claimed in claim 1, wherein the hydrogel is introduced as initial charge in the silylating agent, and then at least one acid and/or base is added.

13. The process as claimed in claim 12, wherein HMDSO is used as silylating agent.

14. The process as claimed in claim 12 wherein hydrochloric acid is used as acid.

15. The process as claimed in claim 1, wherein the silylating agent is generated shortly before and/or during the surface modification.

16. The process of claim 15, wherein the silylating agent is generated shortly before or during the surface modification by means of an acid.

17. The process as claimed in claim 1, wherein the surface modification is accelerated by means of a catalyst.

18. The process as claimed in claim 1, wherein at least one carrier gas or carrier gas stream is used in step b) in addition to the silylating agent.

19. The process as claimed in claim 1, wherein some of the water in pores of the hydrogel reacts with the silylating agent to form a water-insoluble compound.

20. The process as claimed in claim 19, wherein HMDSO is formed.

21. The process as claimed in claim 1, wherein an outer surface of the hydrogel obtained in step a) is dried prior to surface modification.

22. The process as claimed in claim 1, wherein the surface-modified gel is washed with a protic or aprotic solvent prior to step c).

23. The process as claimed in claim 1, wherein the surface-modified gel is washed with the a silylating agent prior to step c).

24. The process as claimed in claim 1, wherein the surface-modified gel is subjected to subcritical drying in step c).

25. The process as claimed in claim 1, wherein the gel obtained in step a) is reacted, prior to silylation, with a solution of a condensable orthosilicate of the formula $R_{4-n}{}^1Si(OR^2)_n$, where n=2 to 4 and $R^1$ and $R^2$ independently of one another are hydrogen atoms or linear or branched $C_1$-$C_6$-alkyl, cyclohexyl or phenyl radicals, or with an aqueous silicic acid solution.

26. The process of claim 25, wherein said condensible orthosilicate is an alkyl or aryl orthosilicate.

27. The process as claimed in claim 1, wherein surface modification is carried out in the presence of additives in the hydrogel.

28. The process as claimed in claim 27, wherein the additives comprise ionic compounds.

29. The process of claim 28, wherein the additives used comprise NaCl.

30. The process as claimed in claim 27, wherein the additives comprise opacifiers.

31. The process as claimed in claim 30, wherein the additives used as opacifiers comprise IR opacifiers.

32. The process according to claim 1, wherein step a) and b) are carried out as a semi-continuous process.

33. The process according to claim 1, wherein steps a) and b) are carried out as a continuous process.

34. The process according to claim 1, wherein step b) results in a hydrophobic gel in a liquid phase substantially immiscible with water, which liquid is separated from an aqueous phase formed by the water from the hydrogel.

35. The process as claimed in claim 1 in which the inorganic hydrogel is a silicatic hydrogel.

36. A process for preparing an organically modified aerogel, which comprises
    a) introducing a hydrogel formed at pH greater than 3 as initial charge,
    b) modifying the surface of the hydrogel obtained in step a) by mixing the hydrogel with a silylating agent to form a hydrophobic surface modified gel, and
    c) drying the surface-modified gel obtained in step b) to form the organically modified aerogel,
wherein a silicatic hydrogel is introduced as initial charge in step a).

37. The process as claimed in claim 36, wherein the silicatic hydrogel introduced as initial charge in step a) is prepared by obtaining it from an aqueous waterglass solution with the aid of at least one organic and/or inorganic acid via the intermediate stage of a silica sol.

38. The process as claimed in claim 36, wherein additives are added before and/or during the preparation of the silicatic hydrogel.

39. The process as claimed in claim 38, wherein additives added are opacifiers and/or fibers.

40. The process according to claim 36 in which the silicatic hydrogel comprises zirconium, aluminum, titanium, vanadium and/or iron compounds.

41. A process for preparing an organically modified aerogel, which comprises:
    a) forming a silicatic hydrogel at pH$\geq$3;
    b) subjecting the silicatic hydrogel formed in step a), optionally after intermediate treatment steps, to surface modification by mixing the hydrogel with a silylating agent to form a surface modified gel; and
    c) drying the surface modified gel obtained in step b), optionally after additional treatment steps, to form the organically modified aerogel
wherein the silicatic hydrogel is prepared by bringing an aqueous waterglass solution to a pH$\leq$3 with the aid of an acidic ion exchanger resin or a mineral acid, and polycondensing the resulting silicic acid by addition of a base to form an $SiO_2$ gel.

42. The process of claim 41 further comprising washing the silicatic hydrogel with water to free it from any electrolyte.

43. A process for producing an organically modified aerogel, which comprises:
    a) forming a hydrogel at pH>3;
    b) surface modifying the hydrogel formed in step a), optionally after intermediate treatment steps, by mixing the hydrogel with a silylating agent to form a surface modified gel; and
    c) optionally after additional treatment steps, drying the surface modified gel obtained in step b) to form the organically modified aerogel;
wherein steps a) and b) are carried out as a semi-continuous process, wherein a continuous or semi-continuous stream of acid is mixed with a continuous or semi-continuous stream of aqueous waterglass solution.

44. The process according to claim 43, wherein the acid stream is admixed with the aqueous waterglass solution through a mixing nozzle.

45. The process for producing an organically modified aerogels according to claim 43, wherein the hydrogel is formed in step a) at pH between pH 3 and pH 8.

46. A process for producing an organically modified aerogels, wherein:
    a) a hydrogel is formed at pH$\geq$3;
    b) the hydrogel formed in step a), optionally after intermediate treatment steps, is subjected to surface modification by mixing the hydrogel with a silylating agent to form a surface modified gel; and
    c) the surface modified gel obtained in step b), optionally after additional treatment steps, is dried to form the organically modified aerogel;
wherein step a) and b) are carried out as a continuous process and a continuous or semi-continuous stream of acid is mixed with a continuous or semi-continuous stream of aqueous waterglass solution.

* * * * *